United States Patent Office 3,431,729
Patented Mar. 11, 1969

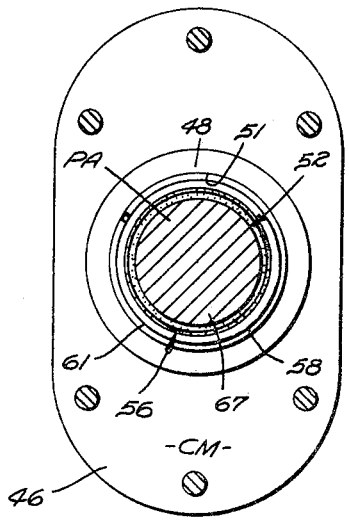
FIG. 3
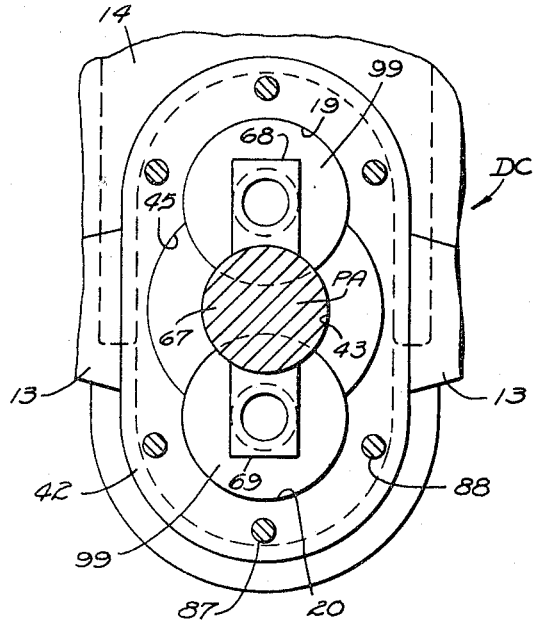
FIG. 4
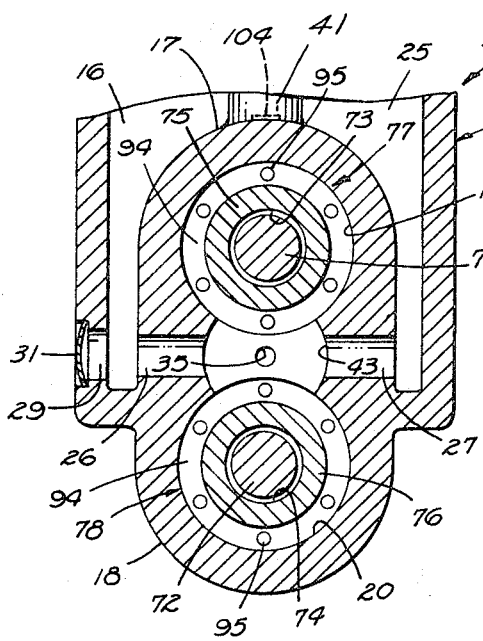
FIG. 5
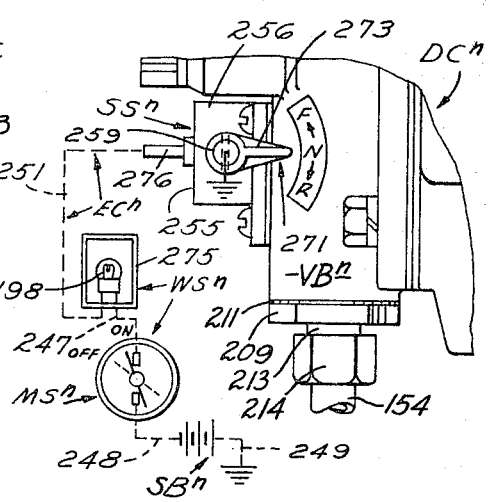
FIG. 18

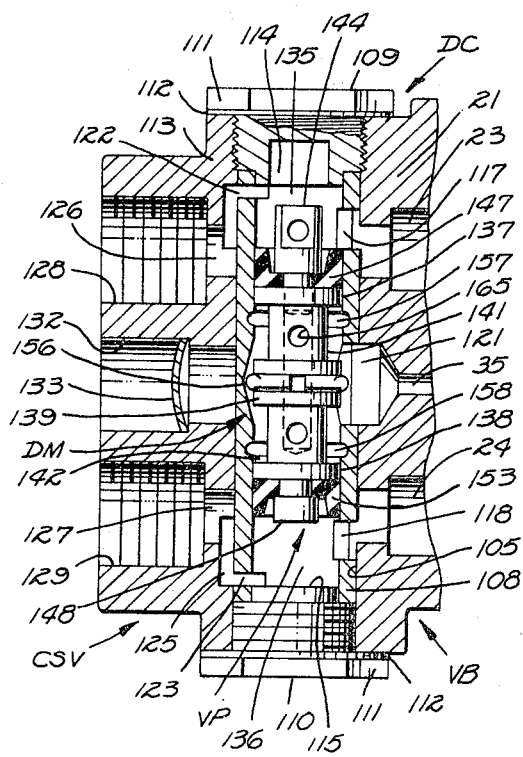
FIG. 7
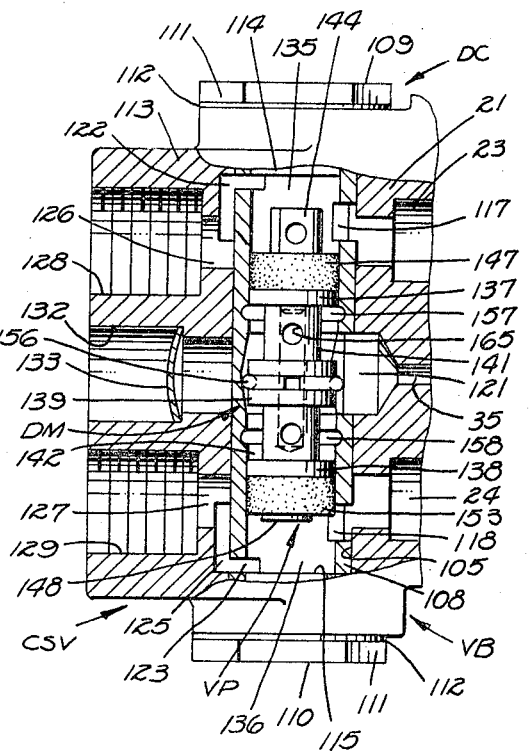
FIG. 8
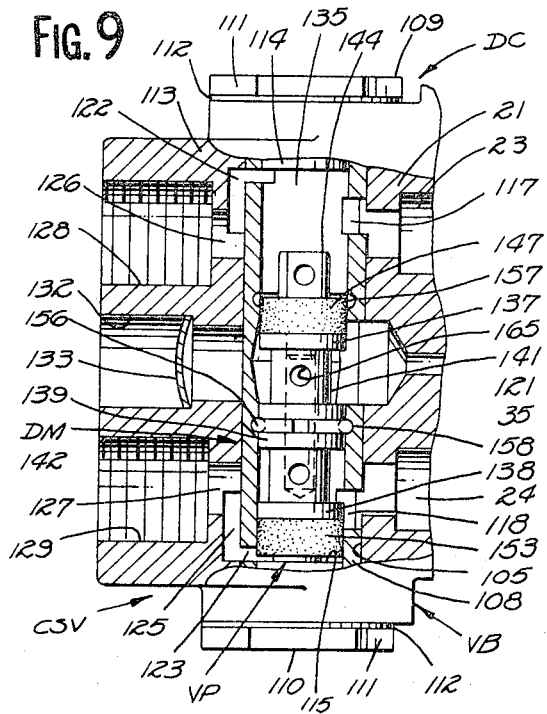
FIG. 9
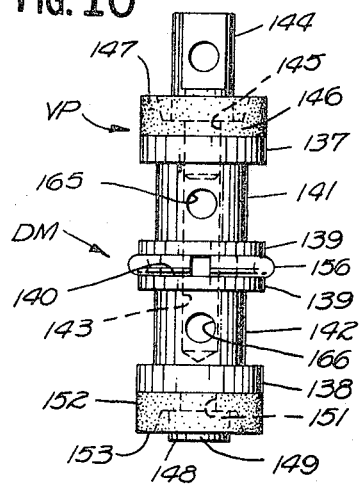
FIG. 10

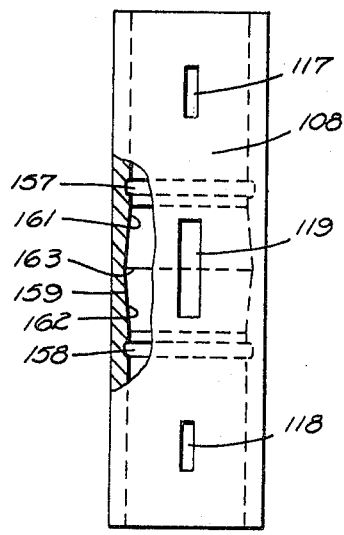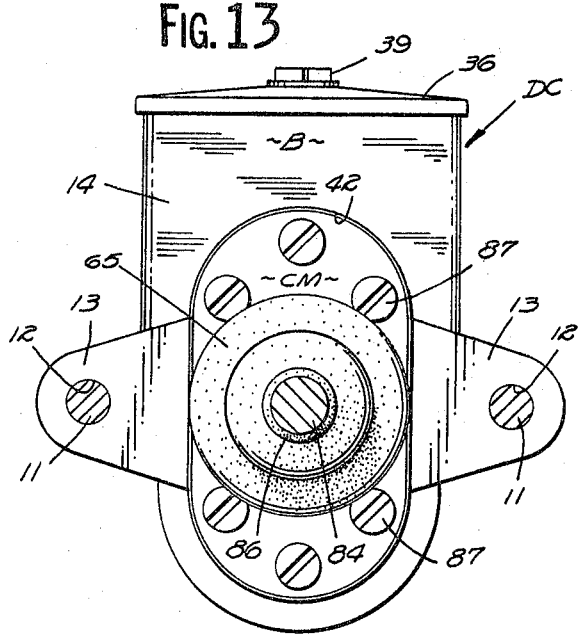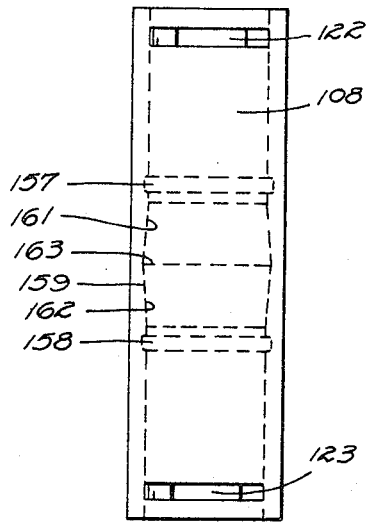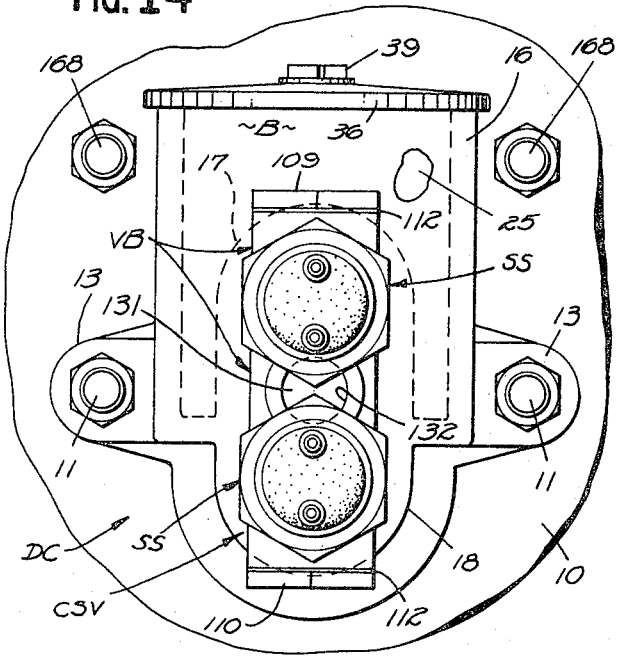

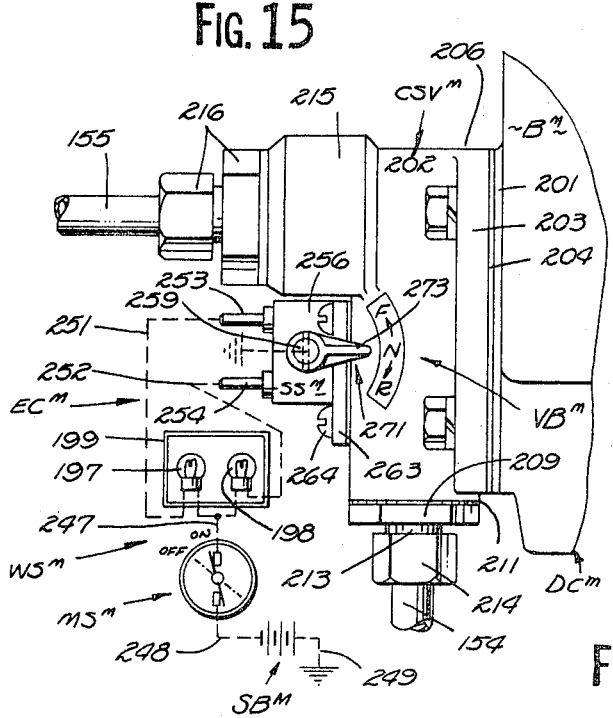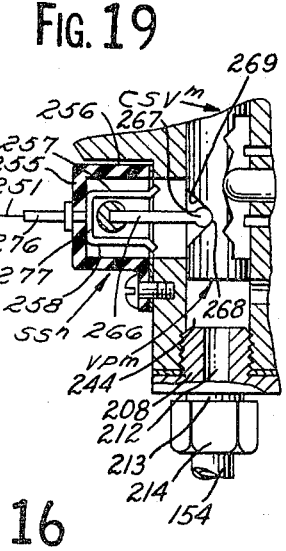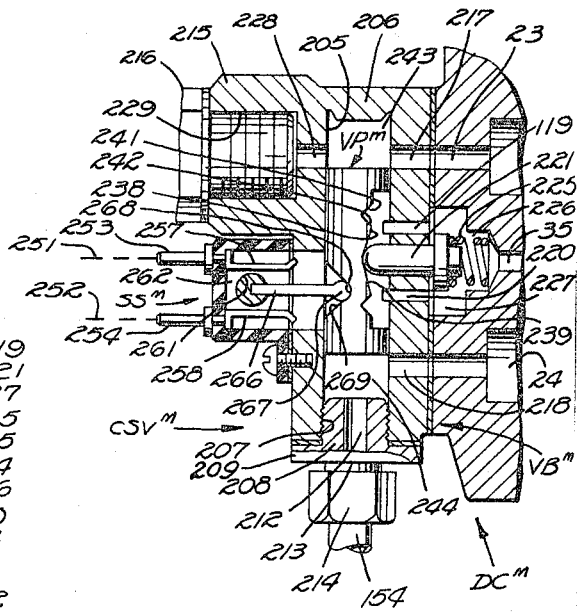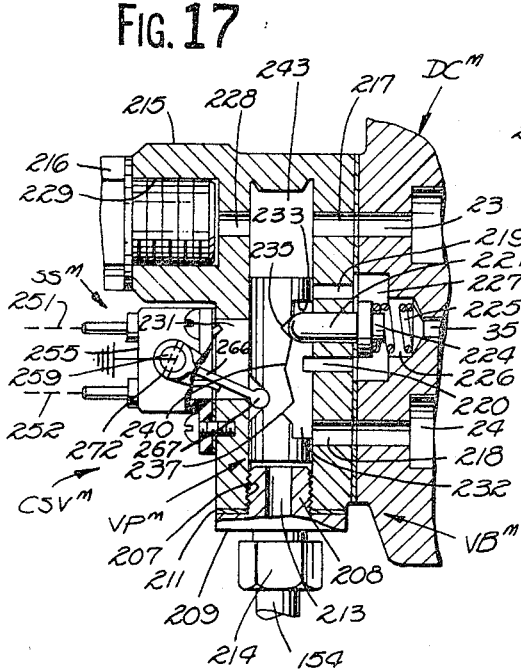

3,431,729
DUAL MASTER BRAKE CYLINDER WITH
WARNING SIGNAL SYSTEM
Glenn T. Randol, 3 E. 2nd Ave., Loch Lynn Heights,
Mountain Lake Park, Md. 21550
Filed Dec. 5, 1966, Ser. No. 599,200
U.S. Cl. 60—54.5     21 Claims
Int. Cl. F15b 7/00; B60t 11/10, 15/46

This invention relates generally to fluid pressure systems such as, for example, the hydraulic brake system on automotive vehicles and the like, the invention having particular reference to a novel and improved dual master brake cylinder in such a system wherein separate hydraulic lines are adapted to convey actuating fluid under pressure to the front and rear brakes, respectively, to enhance safety in braking control by eliminating sole dependence on the conventional single-piston master cylinder to operate all of the vehicle service brakes, and including a novel signaling (detecting) device, which in its operative association with said master cylinder functions automatically to warn the driver of the vehicle whether operating or parked when one or the other or both of the brake lines become inoperative.

The primary objective of my invention is to provide a novel and improved dual master brake cylinder having separate working chambers and pistons reciprocable therein adapted to serve independent brake lines to the front and rear wheel brakes, respectively, and wherein a novel single valve element is movably operative under a pressure differential in said brake lines for equalizing displacement in said lines, for isolating an inoperative (open) line, and for establishing the containment of the fluid worked by the piston serving such inoperative line to the fluid supply reservoir and thereby preventing loss of brake fluid via the inoperative line, said pistons being arranged in overlapping relationship with their axes parallel to produce a compact assembly of the fluid-working components in a chamber-defining body substantially the same size and configuration as the conventional single-piston master cylinder mounted on the vehicle firewall for operation from a suspended brake pedal or otherwise.

An object importantly related to the primary object above resides in the provision of novel shuttle-type fluid compensating and shutoff valve means between the two independent brake lines leading from the aforesaid pair of working chambers, respectively, said valve means having an element shiftable between two extreme "shutoff" positions of control and through a range of fluid compensating control intermediate said two "shutoff" positions, and wherein a spring-loaded detent element cooperates with said shiftable element to releasably stabilize it in said operating positions of fluid control, the compensating range thereof enabling compensation for any fluid demand (displacement) differential in said brake lines under influence of their respective fluid-displacement pistons when moved as a unit by an actuatable element to effect displacement of the brake-fluid in said lines and thereby operating the wheel cylinders of both front and rear service brakes of the vehicle as is understood, movement of said shiftable element to either of its "shutoff" positions is effected by a pressure differential across opposite ends thereof in the two independent brake lines induced by one of the lines becoming inoperative and thereby enabling the pressure in other line to shift the shiftable element accordingly to block fluid flow through the inoperative line and to redirect the fluid worked at substantially atmospheric pressure in the connected working chamber back into the fluid supply reservoir thus containing such worked fluid in said reservoir and, at the same time, the operative line is maintained open to enable application of the wheel brakes associated therewith. In this manner, the inoperative brake line is maintained closed against fluid loss notwithstanding one of the brake lines is open thus rendering it inoperative to transmit working pressure from its working chamber to the wheel cylinders controlled thereby. Thus, when either of the brake lines (front or rear) becomes open as by a break or ruptured seal which would render the connected line inoperative to apply the corresponding brakes, the fluid-compensating and shutoff valve means shift automatically to block loss of fluid from the inoperative line and redirect the fluid as it is worked idly by the associated fluid-displacing piston at substantially atmospheric pressure back into the reservoir for recirculation through the idling working chamber only without interfering with the fluid-pressurizing function of the other fluid-displacing piston serving the operative line. For example, in the event the brake line to the front brakes becomes open resulting in loss of braking force, the fluid-compensating and shutoff valve means shift automatically under influence of the pressure in the operative line, to block fluid flow to the front wheel brakes and at the same time transfers the fluid being worked by the piston connected to the inoperative line to the reservoir so that the latter piston may idle while the other piston functions to operate the rear wheel brakes. Upon such inoperativeness occurring in one of the brake lines, the other brake line is fully effective to operate the connected brakes from the pressure applied to the fluid column by the fluid-displacing piston serving that line. When the inoperative line has been restored to normal operativeness, the valve means require resetting back to its intermediate range of control for both brake lines to be open between their respective working chambers and connected wheel cylinders, such resetting operation being effected manually at will.

Another important object is to provide a novel dual master brake cylinder for a dual brake system including separate fluid-displacement pistons simultaneously actuatable in their respective cylinders, such actuation being characterized by a common working stroke, and wherein a unitary fluid-compensating and shutoff valve is operably related with said dual cylinders whereby the aforesaid compensating range of movement of said valve is effective to compensate for any fluid demand differential existing in the two brake lines without operating to one of its extreme "shutoff" positions unless one of the associated brake lines becomes inoperative to convey pressurized fluid to operate the vehicle brakes connected thereto.

An object related to the object next above is to produce such a dual master brake cylinder in which pedal stroke is substantially uniform whether one or both brake lines are operative since "pedal drop" from normal released position is limited to fluid displacement in the operative line to operate the compensating and shutoff valve to "shutoff" position with respect to the inoperative brake line.

A modified form of the invention provides mechanical means in lieu of electrical signaling elements for indicating automatically the normal operating status of the two brake lines and for resetting upon repairing a faulty line, and wherein an external indicator arm is mechanically connected to the movable element of the fluid-compensating and shutoff valve to indicate automatically the operativeness of both brake lines and which line is requiring more fluid than the other through a range of intermediate movements between a pair of "shutoff" positions for the brake lines, respectively, said indicator arm being formed with a fingerpiece to which manual force is applicable to rotate it and thereby slidably moving the said valve element to normal central position of the aforesaid intermediate compensating range of movement to reset the said valve element in the event one of the brake lines had previously been inoperative or, in the case of repairs to one of the brake lines, the "shutoff" position could be established at will to isolate the inoperative brake line while undergoing repairs to prevent fluid loss from the corresponding working chamber and the fluid supply reservoir as well. Accordingly, the fluid-controlling components such as the primary and secondary piston cups, residual pressure valve, etc., may be replaced without having to "bleed" both brake lines, said indicator arm having a free pointer end registrable with suitable indicia on the exterior of the valve body to visibly indicate whether both of the brake lines are operative, or a faulty line to facilitate "troubleshooting" and thus quickly determining which of the two brake lines is disabled and pinpointing where the trouble exists in such inoperative line. Thus, the indicator arm which moves in synchronism with movements of the compensating and shutoff valve, visibly displays automatically the exact fluid-working conditions in the dual brake system and eliminates "bleeding" the system which requires servicing.

An object related to the object immediately above is to utilize the mechanical connection aforesaid between the indicator arm and movable valve element in a novel manner whereby a pair of spaced stationary switch contacts is mounted in a switch box and suitably insulated therefrom, said box being attached to the exterior of the valve body and having and opening communicating with the latter. A pivoted contact arm provides the aforesaid mechanical connection to produce a single-pole double-throw switch for closing energizable circuit means to a single or a pair of electrical signaling elements (light bulbs) mounted in a suitable box on the instrument panel of the driver's compartment in the vehicle, such light or lights as the case may be, displaying a red signal for driver observation upon depressing the brake pedal to indicate a failure in one or the other of the brake lines or the particular line, respectively, said contact arm being the ground for said circuit means connected to a storage battery (electrical energy) having a ground, and a conductor to one side of a manual master switch with the other side connected to a branched conductor leading to the aforesaid single or pair of signal lights.

Another object related to the two objects next above is to produce a novel and improved combined mechanical and electrical warning means for indicating the operative status of a dual brake system, said mechanical indicator being observable in the engine compartment while the electric indicator is observable in the driver's compartment of the vehicle, and wherein either or both of said indicators are responsive to a pressure differential in the dual brake system adequate to move the compensating and shutoff valve element from its normal fluid demand range of fluid compensation to either of its two extreme "shutoff" positions at which one or the other of said systems, respectively, is inoperative.

A further object is to provide such a combined mechanical and electrical detector, which in its association with the aforesaid dual master cylinder will function automatically to electrically warn the driver of the vehicle when one or the other or both of the systems become inoperative while driving the vehicle, and wherein said mechanical detector is automatically effective and observable from the engine compartment while the vehicle is parked and including means enabling manual resetting of said latter detector to normal operating condition both mechanically and electrically upon restoring operativeness to the overall brake system.

Therefore, another object is to provide a novel dual master brake cylinder of the character under consideration wherein the two working chambers therein are supplied fluid from a common reservoir, and fluid compensation therebetween is effected through a bifurcated fluid passage disposed between the two cylinders and communicating with said compensating and shutoff valve.

Still another object is the provision of a dual master brake cylinder which utilizes in each cylinder conventional piston cups, return springs and residual pressure check valves commercially available for firewall mounted single-piston master cylinders operated, for example, from a suspended-type brake-pedal. Thus, special seals and fluid-controlling components are not required in the present dual master brake cylinder so that stock items are readily available and which are proven in service over long years of use in automotive hydraulic brake systems. In addition, the present dual master cylinder is equally salable as an after-market accessory or for original equipment whether operated from a brake pedal or pressure differential brake booster.

The foregoing objects together with other objects and advantages which will become apparent, reside in the details of construction and operation of the invention as more fully hereinafter described and claimed, reference being had to the accompanying drawings forming a part hereof, wherein like reference characters designate like parts or components throughout the several views, and in which:

FIGURE 1 depicts an installation of my novel and improved dual master brake cylinder and included electric warning system embodying the invention for operation, for example, from the conventional suspended brake-pedal, and shown diagrammatically connected to operate the front and rear vehicle service brakes through independent brake lines, respectively, with the parts shown in normal brake "off" disposition;

FIGURE 3 is a transverse sectional view taken on the line 3—3 of FIGURE 2 showing details of the piston actuator support member adapted to close the open ends of the cylinder and actuator bores;

FIGURE 4 is another transverse sectional view taken on the line 4—4 of FIGURE 2 showing the three parallelly spaced longitudinal bores in the cylinder body and the dual fluid-displacement pistons and actuator member therefor slidable therein, respectively;

FIGURE 5 is another transverse sectional view taken on the line 5—5 of FIGURE 2 showing details of the fluid-displacement pistons and associated fluid return passages;

FIGURE 6 is another transverse sectional view taken on the line 6—6 of FIGURE 2 showing the bifurcated fluid return passage and associated pair of compensating ports;

FIGURE 7 is a sectional view on an enlarged scale of the novel fluid-compensating and shutoff valve means (device) and showing the movable element thereof in normal operating position wherein the fluid demand in both brake systems is substantially balanced;

FIGURE 8 is another sectional view of the fluid-compensating and shutoff valve means on the same scale as FIGURE 7 and showing the movable element thereof operating in its compensating range of movement to compensate for a fluid demand differential in the two brake systems;

FIGURE 9 is another sectional view similar to FIGURE 8 but showing the movable element operated to one of its two "shutoff" positions to isolate the corresponding working chamber in the master cylinder from its connected inoperative line, and connecting said chamber to the reservoir to prevent fluid loss;

FIGURE 10 is a side elevation of the fluid-compensating and shutoff valve element per se on an enlarged scale;

FIGURE 11 is a side elevation of the compensating and shutoff valve liner to show the fluid porting arrangement communicating with the pair of outlet ports and a fluid return passage in the master cylinder body;

FIGURE 12 is an opposite side elevation of the valve liner shown in FIGURE 11 and particularly showing de-details of the porting arrangement communicating with the two separate brake lines;

FIGURE 13 is a rear elevation of the master cylinder showing the detachable support member for the piston actuator, and which serves to close the open ends of the bores in the cylinder body;

FIGURE 14 is a front elevation of the master cylinder showing the mounting flanges for the cylinder body and the fluid-compensating and shutoff valve and threaded outlet ports for connection with the two brake lines;

FIGURE 15 is a fragmentary side elevation of a modified form of the fluid-compensating and shutoff valve means, particularly showing the combined manual-automatic indicator and associated single-pole double-throw switch device operable in synchronism therewith for mechanically and electrically signaling when one of the brake lines becomes inoperative and the relative fluid demand in both systems when both lines are operative;

FIGURE 16 is a sectional view of FIGURE 15 showing the yieldable positioning and control detent associated with the movable valve element, and the pivoted contact arm connection between the indicator and said valve element whereby said indicator is indexed automatically in synchronism with movements of the valve element under pressure differential upon one of the brake lines becoming inoperative to isolate the latter, said indicator being movable manually at will to effect resetting of the valve element upon restoring both brake lines in normal operative condition;

FIGURE 17 is a sectional view similar to FIGURE 16 but showing an operated status of the valve element effective to isolate an inoperative line by blocking the associated outlet port in the master cylinder body;

FIGURE 18 discloses a modified form of the single-pole double-throw switch device shown in FIGURE 15, and which is adapted to modify the warning system shown in FIGURE 15 to include only one signal element (light); and FIGURE 19 is a horizontal vertical sectional view of the FIGURE 18 modification showing structural details of the modified signal control switch device and associated valve element mechanically connected to operate the former in synchronism therewith to indicate that one or the other of the brake lines has failed.

Figure 1:
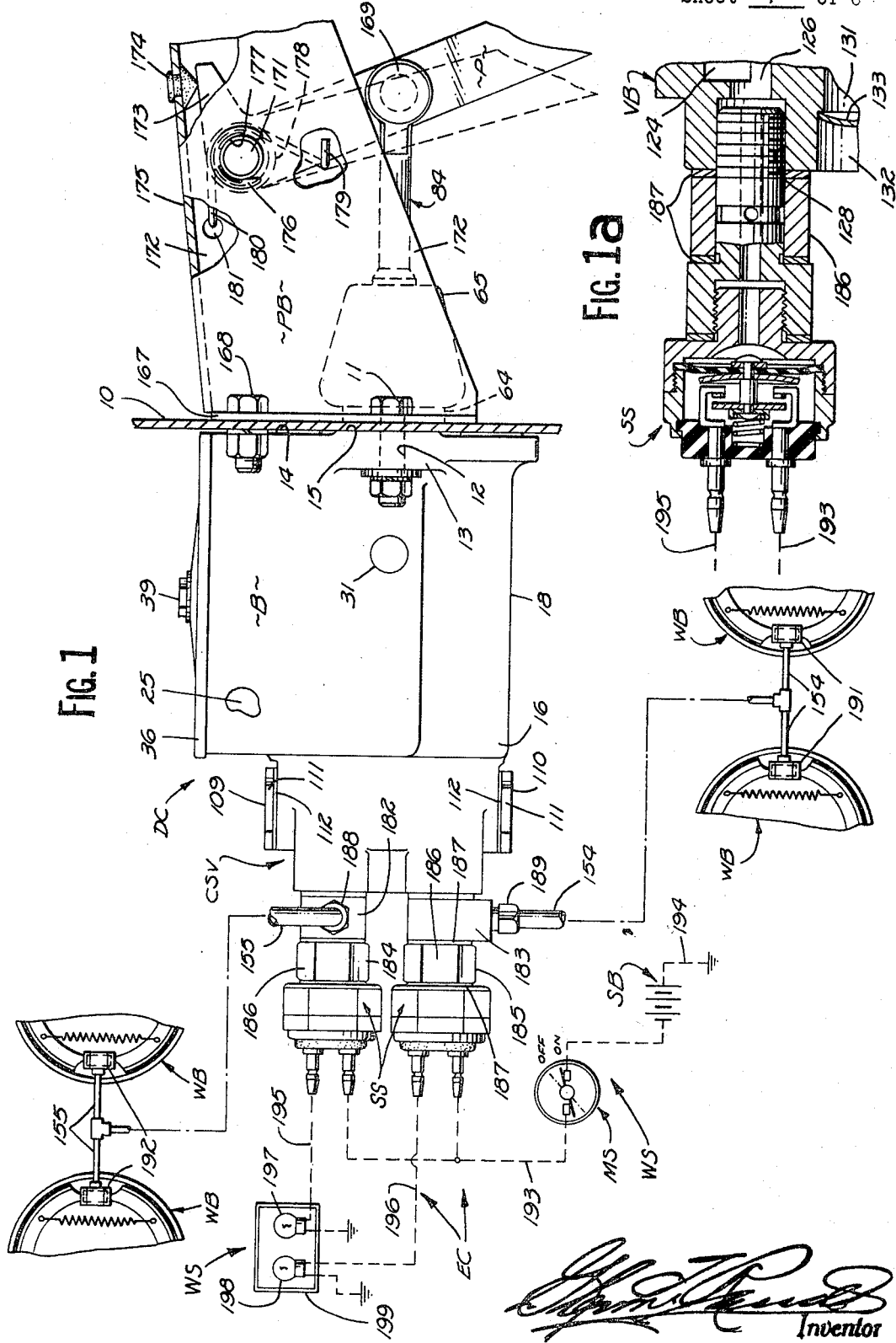
FIGURE 1A is a longitudinal section of one of the signal control switches on an enlarged scale from FIGURE 1, to clarify the switch structure and fluid connections to the associated master cylinder outlet port and brake line.
Figure 2:
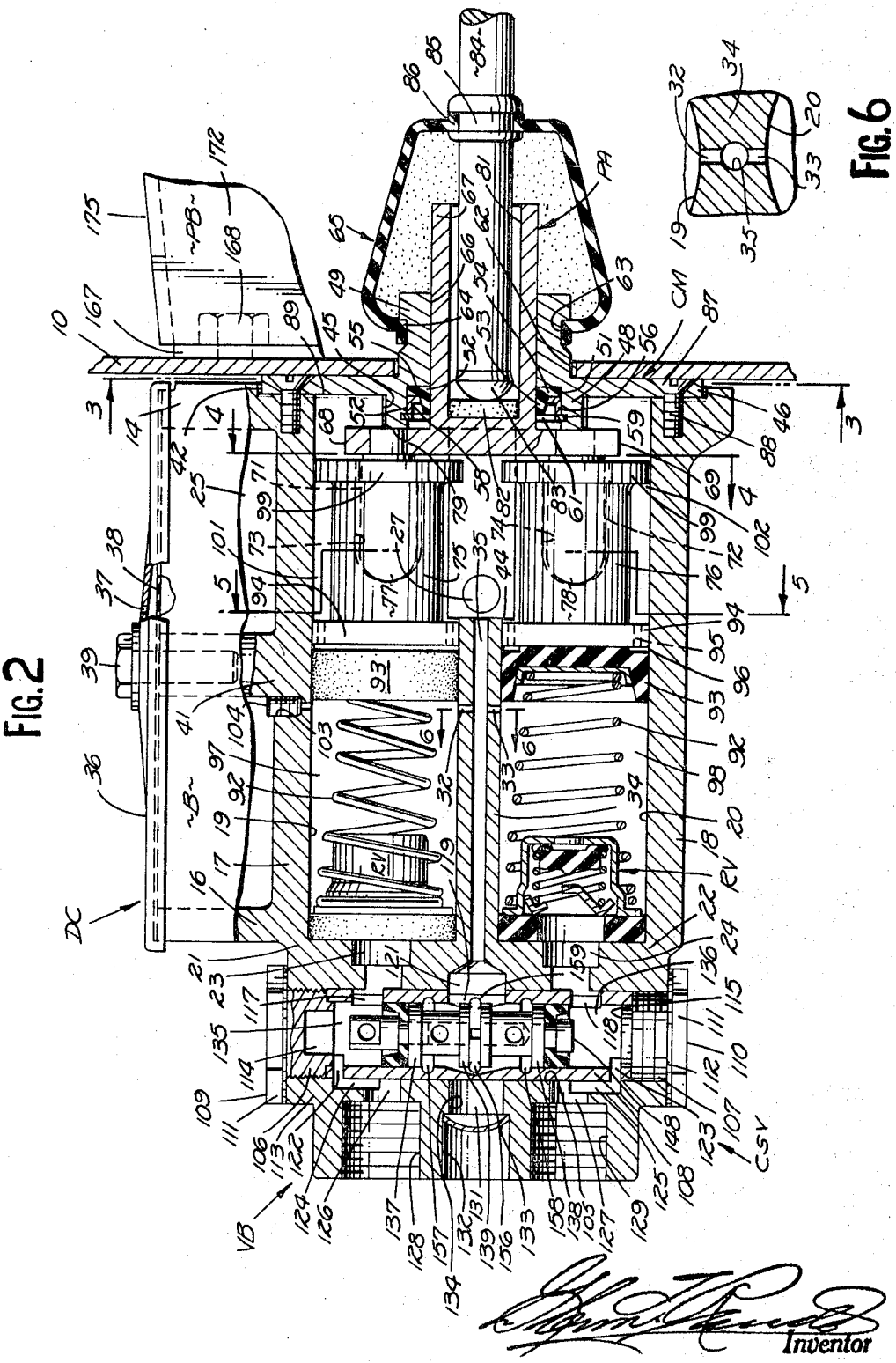
FIGURE 2 is a longitudinal vertical section of the master cylinder per se shown in FIGURE 1, and which depicts the interrelation of the fluidworking parts on an enlarged scale for clarification.

Referring now to the drawing and particularly to FIGURES 1 through 7 on which I have used the reference character DC to generally designate my novel dual master brake cylinder, the chamber-defining body thereof being designated by reference character B which is adapted, for example, for mounting in operating position on the engine side of the vehicle firewall 10 by the usual means of a plurality of bolts 11 projecting through a like number of holes 12 in lateral projections (flanges) 13 integral with the rear end portion 14 of said cylinder body, said mounting flanges presenting an offset outer face 15 contiguous to said firewall as shown in FIGURES 1 and 2. The cylinder body B is provided with a front end wall 16 and a pair of parallelly spaced cylinders 17, 18 preferably arranged in stacked formation and having longitudinal bores 19, 20, respectively, open at one end and closed at the other as by integral walls 21, 22, respectively, through which discharge (outlet) ports 23, 24, respectively, are provided. A fluid-supply reservoir 25 having an open top to facilitate fluid replenishment is formed in the cylinder body B above and partially to the sides of said pair of master cylinders (see FIGURE 5), and which communicates with the bores 19, 20 via intake passages (ports) 26, 27 best demonstrated in FIGURE 5. A drilled transverse counterbored entrance opening is provided at 29 to enable insertion of a drill to process the two latter intake passages, said opening being closed fluid-tight by an expansion plug 31 as shown in FIGURES 1 and 5. A pair of compensating ports 32, 33 spaced forwardly of said intake ports is provided in that portion of the circular wall 34 common to both master cylinders, said latter ports having continuous communication with a horizontal fluid return passage 35 drilled or otherwise provided in said wall portion 34, and which is open at both ends as shown in FIGURE 2 to produce a bifurcated compensating passage system for the two cylinder bores 19, 20. A removable cover 36 is provided for the open top of said reservoir and is processed with a breather vent 37 communicating with a sealing baffle member 38 to prevent fluid-surge from discharging fluid through said vent, said cover being secured in closing position by a cap screw 39 in threaded engagement with a threaded hole formed in a boss 41 upstanding from the top of the upper cylinder wall.

The rear wall 14 is formed with a vertically elongated recess 42 having terminal arcuate ends best shown in FIGURES 4 and 13. A longitudinal bore 43 is centrally processed between the rear end portions of the bores 19, 20 to intersect the latter, and extends coaxially with respect to the aforesaid fluid compensating and return passage 35 slightly forward of the aforesaid transverse intake ports 26, 27 to produce at 44 a shoulder, and the rear end of bore 43 terminates in a counterbore 45 which also intersects a larger circumferential portion of said bores 19, 20. A closure member CM is provided for the open rear ends of said bores 19, 20 and counterbore 45, said member comprising a plate 46 of substantially the same configuration as recess 42 and is of such thickness as to extend rearward of the face of the rear wall 14 as shown in FIGURE 2 to space the latter from the engine side of the firewall 10 so that the outer faces on the plate and aforesaid mounting projections 13 are flush (see FIGURES 1 and 2). The aforesaid flush faces on the projections and plate serve to stabilize the dual master cylinder unit DC in operating position on the vehicle by means of said bolts 11. Centrally disposed on opposite sides of said plate 46 is an inner and outer circularly walled hubs 48, 49, respectively, which are disposed coaxially in the central portion of said plate with the wall of the inner hub formed with a counterbored recess 51 to receive a lip-type pliant seal 52 provided with a horizontal annular sealing lip 53 and a vertical annular base segment 54 normal to said lip and contiguously mounted with respect to the bottom 55 of said recess 51. Forwardly positioned in said recess is a seal retaining member 56 having a horizontal annulus 57 interfitting said recess and a radially inturned leg 58 adjacent said base segment to bias the latter into sealing relation with respect to the bottom of said recess. A circular groove 59 is processed in the circular wall of said recess adjacent the forward open end thereof, and is fitted with a split retaining ring 61 to stabilize the seal 52 and retainer member 56 within said recess 51. The inner hub 48 interfits the aforesaid counterbore 45, and the outer hub 49 is adapted to project rearward through an opening 62 in said firewall 10 as shown in FIGURE 2, said outer hub being provided with an external annular groove 63 spaced rearward of said firewall for reception of the forward annular bead 64 of a flexible dust-excluding boot 65. The hub 49 is formed with an axial bore 66 which terminates forwardly flush with the bottom of said recess 51. Slidably projecting through said seal 52 and axial bore 66 which is coaxial with and of the same diameter as the aforesaid bore 43, is an elongated cylindrical extension 67 of a piston-actuator generally designated PA, the forward terminal portion of said extension being formed with a pair of oppositely extending radial thrust elements 68, 69 which carry forwardly extending thrust rods 71, 72, respectively, projecting into blind bores (sockets) 73, 74 formed in the reduced body portions 75, 76 of a pair of fluid-displacing members (pistons) 77, 78, reciprocably disposed in said bores 19, 20, respectively, whereby reciprocable movement of said piston-actuator PA effects similarly unitary movements of said pistons to apply and release the vehicle wheel brakes WB (see FIGURE 1) as is understood. The bore 43 between the cylinder bores 19, 20 is coaxially disposed with respect to the fluid return passage 35, and which serves in conjunction with the axial bore 66 in said outer hub 49 to slidably support the actuator extension 67, the latter being characterized by an actuating stroke defined by the aforesaid shoulder 44 and the confronting end 79 of the circular wall of the inner hub 48, thus the piston-actuator PA is provided with a normal released position when the thrust elements 68, 69 abut said hub end 79 and a fully protracted operating position when the forward end of said extension 67 abuts said shoulder 44.

The actuator extension 67 is provided with a blind axial bore 81 substantially coextensive therewith, the bottom of which is provided with a pliant thrust pad 82 against which the forward enlarged domical end 83 of a pushrod 84 bears to drive the piston-actuator PA forwardly from the position shown in FIGURE 2 to pressurize the brake fluid for braking the vehicle wheels as will subsequently be more fully described. Spaced from the rear end of said actuator extension 67 is a pair of annular shoulders formed integrally with said latter pushrod to produce an annular channel 85 therebetween for reception of an annular reduced bead 86 defining the smaller rear end of said dust-excluding boot 65, and thereby protecting the bearing surfaces between said actuator extension and hub aforesaid as well as internal moving parts in the cylinder body B. The enclosure member CM is secured in fluid-tight position with respect to said recess 42 by means of a plorality of flat head screws 87 which, for example, engage threaded holes 88 processed in the bottom of said resess 42 and in an interposed gasket 89 as shown in FIGURES 2 and 13.

Each of the cylinders 17, 18 is provided with the conventional residual pressure check valve RV, a piston cup retainer, a normally compressed spring 92 operably disposed to react between said residual valve and cup retainer, a resilient piston cup 93 backed by a piston head 94 and acted on by said retainer, said piston head having a plurality of circumferentially spaced fluid passages 95, a valve washer 96 between said piston cup and head for controlling one-way fluid flow from said reservoir through said passages into a pair of variable pressure working chambers 97, 98 in the forward end portion of said cylinder bores 19, 20, respectively, and a guide land (flange) 99 spaced rearward of said piston head and which are interconnected by the aforesaid reduced body portions 75, 76 to provide annular static fluid chambers 101, 102 therebetween to produce the aforesaid fluid-displacement pistons 77, 78, respectively, said working chambers being effective upon closure of their respective compensating ports 32, 33 by said piston cups to pressurize the fluid trapped therein and connected brake lines to actuate the wheel brakes WB while the aforesaid annular fluid chambers continuously communicate with the aforesaid intake ports 26, 27 and fluid passages 35, 95.

It will be noted that a threaded processing hole 103 is provided through the wall of the upper cylinder 17 in alignment with the ports 32, 33 to facilitate drilling the latter ports, and which is closed by a plug 104 and remains so upon assembly of the dual master brake cylinder DC.

The fluid-compensating and shutoff valve means

The front end wall 16 of the master cylinder body B includes the aforesaid fluid-compensating and shutoff valve means operably disposed in a preferably integrated embossment (valve body) VB, and which is generally designated as CSV, said valve means being disposed vertically on the exterior of said front wall in alignment with the aforesaid pair of stacked master cylinders 17, 18, best shown in FIGURES 1 and 2, and comprises an axial bore 105 in said valve body coextensive therewith and provided with terminal threaded end portions 106, 107. A body liner 108 is pressfitted into said axial bore and spans the space obtaining between the inner confronting ends of the aforesaid threaded portions in fluid tight sealing relation. Threaded closure caps 109, 110 are adapted to close the open ends of said axial bore 105 as shown with both caps terminating externally in a preferably hexagonal flange 111 which overlies an annular gasket 112 compressed against the circular marginal end portions of the valve body wall 113 defining said axial bore. The threaded portion of the upper closure cap 106 is provided with a blind axial bore 114, and the threaded portion of the lower cap 107 terminates at its inner end in a reduced circular portion 115, the latter and bottom of the blind bore 114 serving as stops (abutments) defining the two extreme (shutoff) positions of a double-acting valve element (piston) VP slidably mounted in said body bore liner 108.

The valve liner 108 comprises a pair of ports 117, 118 in continuous communication with the aforesaid master cylinder outlet ports 23, 24, respectively, and an intermediate fluid return port 119 in continuous communication with a fluid-compensating and return chamber 121 connected to the forward end of the aforesaid fluid return passage 35 (see FIGURES 2 and 11), and the opposite side of said valve liner is formed with a pair of spaced ports 122, 123 which communicate with passages 124, 125, respectively, formed in the surface of said axial bore 105, the latter passages serving to interconnect said ports 122, 123 with a pair of fluid discharge (outlet) ports 126, 127, respectively, having terminal threaded counterbores 128, 129, respectively (see FIGURES 2, 7 and 12). Intermediate said outlet ports 126, 127 is a processing bore 131 for drilling the aforesaid fluid return chamber 121, said latter bore terminating in a counterbore 132 and is closed by an expansion plug 133 engaging an annular shoulder 134 defining the juncture of said bores 131, 132.

The valve piston VP is normally centrally positioned with respect to opposite ends of said valve liner 108 and therefore spaced from the inner confronting ends of the threaded portions of the closure caps 109, 110 at opposite ends of said valve body VB. This spacing produces a pair of valve chambers 135, 136 at opposite ends of said valve piston and which normally connect ports 117, 122 and 118, 123 as shown. This valve piston VP comprises spaced upper and lower terminal lands 137, 138 and an intermediate land 139 formed with an annular groove 140. Reduced body portions interconnecting said lands produce a pair of static fluid return annular spaces 141, 142 which communicate continuously with each other via an axial bore 143 provided in said valve piston and with said fluid return port 119. The lower end of said axial bore is closed and the upper open end is closed by a shouldered reduced extension defining a projection 144 formed with a transverse hole adjacent its outer end and an annular space 145 is provided on said projection adjacent the outer face of said upper land to receive a centrally apertured base segment 146 of a pliant cup seal 147, and the lower land 138 is also provided with an integral reduced projection 148 having a terminal outstanding flange 149 defining an external annular space 151 between said flange and confronting face portion on said lower land, said latter space being adapted to receive a centrally apertured base segment 152 of another pliant cup seal 153 whereby loss of pressure from said valve chambers 135, 136 is prevented. Movement of the valve piston VP to its lower "shutoff" extreme as shown in FIGURE 9 to isolate the rear brake line 154, for example, is established by the end of said flange 149 abutting the portion 115 on the lower closure cap 107, and movement to the other extreme to isolate the front brake line 155, for example, is established by the upper end of the extension 144 abutting the bottom of the blind bore 114 formed in the upper closure cap 109.

The annular groove 140 in the intermediate valve land 139 is adapted to receive a split springy detent ring 156 capable of radial expansion and contraction. This ring is adapted to cooperate with a pair of spaced annular detent grooves 157, 158 and an intermediate modified V-shaped detent channel 159 indented in the circular interior surface of said valve liner 108 to produce what may be termed a yieldable detent mechanism DM, the latter channel being characterized by a pair of camming faces 161, 162 diverging from a central apex 163 to the normal circular surface defining the inner side of said valve liner 108 in spaced relation to the aforesaid grooves 157, 158 (see FIGURES 7, 11 and 12). It is thus seen that the expansible bias of the detent ring 156 in cooperation with the camming ramps 161, 162 forces the valve piston VP toward its central position within its normal fluid-compensating range as shown in FIGURES 2 and 7 wherein the two brake lines 154, 155 are connected to their respective master cylinders 17, 18 to apply and release the rear and front vehicle brakes WB, however, in commercially applying the present invention, for example, to actuate the front and rear service brakes on a motor vehicle and the like, it is desirable to proportion the fluid-working pistons so that the displacement of each equals the fluid displacement required by its respective portion of the overall brake system actuatable thereby notwithstanding both fluid-displacement pistons move the same distance as a unit. Thus, if the pressurized displacement for each system is equal then the two pistons would displace an equal amount of fluid into their respective brake lines, but if the ratio of fluid displacement of the two connected brake systems which receive fluid under pressure from the connected working chambers 97, 98 should become different due to lining wear and other factors affecting the uniform operation of the two brake systems so that one system would require more fluid than the other, the aforesaid fluid-compensating range of movement of the valve piston VP would adjust to compensate for such difference by equalizing displacement in both brake systems to set up "solid," otherwise, for example, the front brakes would be applied and the rear brakes not applied and vice versa. This novel feature of combining fluid compensation to the dual brake system and isolating the system which becomes inoperative under control of a single valve piston is believed new to the art since this same valve piston under an extreme pressure differential existing in the valve chambers 135, 136 due to one of the brake lines being open, is effective to force said valve piston downwardly, for example, to isolate the rear brake line 154 and wherein the detent 156 engages the detent groove 158 and, in the case of a front brake failure, such pressure differential would force the valve piston upwardly to disconnect the ports 117, 122 to isolate the front brake line 155, the latter shutoff position being defined by the detent 156 engaging the upper detent groove 157.

Also it should be importantly noted that when the valve piston is in either of its extreme "shutoff" positions, the fluid return spaces 141, 142 are so positioned with respect to either of the ports 117, 118 (see FIGURE 9) that the inoperative rear brake line 154, for example, is disconnected from the port 118 and the latter port placed in communication with the fluid return port 119 for the fluid worked by the lower fluid-displacement piston to be redirected to flow back into the reservoir 25 via said fluid return passage 35 and thereby preventing fluid loss while operating the operative front brake line to control the vehicle. Thus, the piston in the ineffective working chamber is effective to idly circulate the fluid therein via the reservoir 25 and then back into said working chamber. This redirection of the fluid back into the reservoir 25 also holds true for the front brake line when it becomes open. The fluid return spaces 141, 142 are positioned to isolate the port 118 and connect the upper port 117 to the fluid return port 119 for the upper piston to idly work the fluid in its associated working chamber into the reservoir 25 and thence back into the latter chamber thus confining the circulation of the fluid between the ineffective working chamber and the reservoir to prevent fluid loss via the open front brake line.

The valve piston VP additionally includes two pairs of transverse fluid passages 165, 166 which intersect the aforesaid axial bore 143 to maintain said fluid return spaces 141, 142 in communication with each other, so that one or the other of said spaces would be connected to the return port 119 in the event individual ports on opposite sides of the intermediate land 139 would be used in lieu of said elongated port 119 and thereby maintaining the fluid in said spaces at atmospheric pressure level for return to the reservoir 25 via passage 35.

Reference is now made to FIGURES 1 and 1A wherein there is disclosed an installation of my novel dual master brake cylinder DC on a motor vehicle or the like, such installation including a pedal support bracket generally designated PB of U-shaped cross section provided with a pair of lateral outturned flanges 167 on opposite sides defining the forward end thereof, said flanges being secured at their top to the driver side of the vehicle firewall 10 by means of a pair of bolts 168 and the bottom portions being secured to the same side of the firewall under the heads of the aforesaid mounting bolts 11 for the master cylinder body B as shown to produce a stabilized assembly of the bracket and master cylinder unit DC on opposite sides, respectively, of said firewall 10.

The aforesaid pushrod 84 is exemplarily pivotally connected at 169 to an intermediate portion of a suspended-type of brake pedal P, the upper end portion of the latter being pivotally connected to the bracket PB by means of a cross pin 171 supported in aligned holes through spaced side segments 172 which are outturned in opposite directions at their forward ends to produce the aforesaid mounting flanges 167. The upper end portion of the pedal is characterized by a rearward extending element 173 at substantially right angles to the pedal shank. The end of this latter element is adapted to engage a pliant bumper (stop) 174 attached as shown to the underside of a bracket connecting segment 175 for said side segments, for defining the normal released position of said pedal. The cross pin 171 is locked against fortuitous axial displacement with respect to said bracket by means of retaining rings 176 engaging complemental annular grooves 177 formed at opposite exposed ends of said cross pin adjacent said side segments, respectively, as shown. A normally pre-energized torsional spring 178 is mounted on said cross pin between the upper end portion of the pedal and confronting portion on said side segment with opposite ends 179, 180 of said spring reacting on the pedal shank and adjacent side segment, respectively, with spring end 180 connecting to said side segment by means of a hole 181 whereby unwrapping bias of said spring is effective to urge the pedal P toward released position.

Block-type hydraulic fittings 182, 183 are impinged between the marginal surfaces at the outer ends of said discharge ports 126, 127 and a pair of fittings 184, 185 having axially bored reduced portions projecting from hexagonal bodies 186 provided with threaded counterbores. A pair of gaskets 187 on opposite sides of said last-defined fittings effect a seal with said block. The aforesaid reduced portions on the fittings 184, 185 are of commercial design and provided with external annular fluid channels having a plurality of ports through the bottom walls thereof communicating with the axially bored portions aforesaid, and which have terminal threaded portions threadingly engaging the aforesaid counterbores 128, 129, respectively, to mount said blocks in fluid-tight sealed relation on the fluid-compensating and shutoff valve body (see FIGURE 1A). Each of the blocks is provided with a threaded hole communicating with the aforesaid fluid channels, for the purpose of receiving bushings 188, 189 with bushing 188 connecting in a well known manner to the rear brake line 154 communicating with the rear wheel cylinders 191, while bushing 189 similarly connects to the front brake line 155, the latter line communicating with the front wheel cylinders 192.

Warning signal device

The aforesaid counterbores in the hex flanges 186 communicate with the axial bores, respectively, in said fittings 184, 185, and receive the threaded mounting stems of a pair of commercial hex-body signal (detecting) switches SS normally "open" (see FIGURE 1A) under a predetermined residual pressure in said brake lines when the pedal P is released or when intensified brake operating pressure is required under pedal operation from normal released to operating position to pressurize the brake-fluid above said residual pressure to operate the vehicle brakes as is understood, said switches being operable to "closed" condition by their respective normally compressed springs shown, upon the pressure in said brake lines dropping substantially below said residual pressure. An energizable electric circuit EC having a manual switch MS operable to "on" and "off" positions interposed in series in said circuit, and which is connected at one side by a branched conductor 193 to one side of each of said switches and the other side to a storage battery SB provided with a ground connection 194. The other sides of said switches are connected by separate conductors 195, 196, respectively, to a pair of grounded signaling elements (light bulbs) 197, 198, respectively, mounted in a signal box 199 conveniently located for observation by the vehicle driver on the instrument panel and with the fluid-compensating and shutoff valve CSV in normal compensating operation as shown in FIGURES 7 and 8, the signal lights designated F and R will remain "off," but in the event one of the brake lines becomes inoperative (open), for example, the rear brake line 154, upon depressing the pedal P, the valve piston VP in the valve means CSV would take up the position shown in FIGURE 9 at which position the pressure in the front brake line 155 is maintained to keep the signal switch connected to this line open, while the inoperative rear brake line has lost pressure below the residual value of 8–10 p.s.i., for example, with resultant closing of the associated signal switch to complete the circuit to the "R-light" and turn it "on" to show "red" behind a glass panel on the aforesaid signal box.

From the foregoing description of my novel electric signaling system, the driver is instantly made aware of failure of one of the brake lines so that immediate repair can be made without relying unknowingly on one brake line to brake the vehicle. In the event that both brake lines become inoperative, both lights would show "red" to warn the driver that the vehicle is without brakes. Absence of a "red" signal is indicative that the front and rear brakes are in operative braking condition.

The modified fluid-compensating and shutoff valve means and included warning signal system Referring now to FIGURES 15, 16 and 17 wherein I have disclosed a modified form of the aforedescribed fluid-compensating and shutoff valve means generally designated CSV$^m$, said valve comprising an elongated valve body VB$^m$ vertically disposed for attachment as shown to a finished surface pad 201 integral with the front wall of the master cylinder body B$^m$, such attachment being effected by a plurality of cap screws 202, preferably four in number, projecting through holes formed in a pair of lateral flanges 203 integral with the rear side of said valve body VB$^m$, into threaded engagement with matching threaded holes formed in said pad as shown. An interposed gasket 204 under compression by said cap screws is effective to produce a fluid-tight seal between the valve body VB$^m$ and pad.

The vertical elongated portion of the valve body VB$^m$ is processed with a blind axial bore 205 closed at its upper end by an integrated wall 206 and the lower end has a terminal threaded portion 207 adapted to receive the reduced threaded portion 208 of a closure plug 209 having a hex profile for reception of a wrench for installation of said plug. An annular gasket 211 is positioned between said hex profile and marginal surface defining the lower end of said bore threaded portion under compression to effect a fluid tight seal therebetween. The aforesaid plug is provided with an axial bore 212 and an external threaded extension 213 which receives a hydraulic fitting 214 for connecting the rear brake line 154 in a well known manner. The upper end portion of the valve body VB$^m$ is characterized by an integral horizontal forwardly extending boss 215 which is similarly connected to the front brake line 155 by an axially bored commercial fitting 216 as shown.

Extending through the mounting side of said valve body VB$^m$ is a pair of spaced discharge ports 217, 218 communicating with the aforesaid discharge ports 23, 24, respectively, in the dual master cylinder DC$^m$. Intermediately disposed is another pair of spaced fluid return ports 219, 220. Centrally disposed with respect to the latter pair of ports, is a bore in which a slidable detent element 221 is supported, and which includes a dome-shaped end 222 and an opposite outstanding flange 223 terminating in a reduced extension 224 to support one end of a normally compressed spring 225 with the other end seating on the bottom of a drilled cavity 226 co-axially communicating with the aforesaid fluid return passage 35 leading to the fluid supply reservoir 25 and which is intersected by the aforesaid compensating ports 32, 33. The aforesaid cavity 226 empties into an enlarged fluid return chamber 227 communicating with the aforesaid pair of fluid return ports 219, 220 as shown. The detent flange 223 is adapted to receive reaction from spring 225 and thereby producing a yieldable-type detent mechanism DM$^m$ for an important purpose to be hereinafter described.

The forward side of the valve body VB$^m$ is processed with a discharge port 228 in alignment with the said port 217 in communication with the axially bored fitting 216 in threaded engagement with a threaded bore 229 formed in the aforesaid horizontal boss 215, and a centrally disposed relatively larger opening 231 as shown.

Slidably disposed in said bore 205 is a valve piston element VP$^m$ comprising an elongated cutout 332 formed with terminal shoulders 233, 234 and their connecting flat bottom defining three V-shaped transverse detent notches 235, 236, 237 in spaced relation with the central notch 236 having wider diverging camming faces 238, 239 of less angulation from their common apex 240 than similar shorter faces 241, 242 defining the other two extreme notches whereby the dome-end of said detent element 221 cooperates with said notches to releasably stabilize the valve piston VP$^m$ in either of its two extreme "shutoff" positions and accommodating a fluid-compensating range of movement therebetween, said camming faces 238, 239 under bais from said detent element being effective to continuously urge the valve piston VP$^m$ toward its central position wherein the detent element is engaging the apex 240 and accommodates opposite compensating movements of said valve piston VP$^m$ within the limits of the outer terminal ends of said camming faces to compensate for any fluid demand differential existing in the two brake lines 154, 155 so that actuation of the dual master cylinder DC$^m$ will effect a "solid" set up of the fluid columns defining the fluid lines to the rear and front wheel cylinders. Should both brake systems require an equal amount of fluid for a "solid" set up of all four brakes, then the valve piston VP$^m$ would maintain substantially its central normal position as shown in FIGURES 15 and 16.

As shown in FIGURE 16, the valve piston VP$^m$ normally occupies a central position with respect to the length bore 205 when the dual brake system has substantially equal fluid requirements, with opposite ends thereof spaced from the aforesaid upper wall 206 and confronting end of the threaded portion 208, respectively, of said closure plug 209. These two spaces at opposite ends, respectively, of the valve piston VP$^m$ produce what may be termed a pair of fluid pressure valve chambers 243, 244, the former normally connecting the aforesaid outlet ports 217, 228, and the latter chamber normally connecting the outlet port 218 and the axial bore 212 in the aforesaid closure plug 209 as shown.

A modified warning signal system generally designated WS$^m$ similar to the main embodiment, is adapted to produce a visible or audible signal illustrated herein as the aforesaid pair of light bulbs 197, 198 conveniently located in the signal box 199 on the instrument panel for driver observation, said light bulbs being connected at one side to a common conductor 247 forming part of an energizable electric circuit EC$^m$, which leads to one side of the master (ignition) switch MS$^m$ operable to "on" and "off" positions and which in turn is connected on its other side by a lead 248 to the storage battery SB$^m$ grounded at 249. A pair of conductors 251, 252 connected to the other sides of said light bulbs lead to a pair of terminal posts 253, 254, respectively, mounted on the closed non conductive end 255 of a hollow switch box 256, said terminal posts extending through suitable openings into said switch box for connection with mounting flanged ends of a pair of switch contacts 257, 258 which preferably have free flexible ends and parallelly spaced horizontally with the free diverging ends serving as contact points as shown. A switch actuating shaft 259 which serves as a ground connection to the vehicle, is rotatably supported in aligned holes 261 through lateral sides 262 of said switch box, the latter terminating at its open end in a pair of mounting flanges 263 which serve to attach the switch box to a mounting pad on said valve body VB$^m$ by means of a plurality of screws 264 engaging complemental threaded holes in said pad with the open end of said switch box mating with the aforesaid opening 231 in the valve body.

A switch-actuating contact arm 266 is rigid at one end with said shaft 259 for co-rotation therewith and the opposite free end 267 of said contact arm terminates in a rounded portion which is adapted to extend through said opening 231 into engagement with a slotted apex 268 defining a pair of spaced opposing control positions of a V-shaped cutout 269 transversely processed in said valve piston VP$^m$ (see FIGURES 16 and 17), and thereby mechanically connecting said valve piston and contact arm for the latter to impart reciprocating movements to the former as a unit for valve actuation in its fluid-compensating range of movement and to its two extreme "shutoff" positions wherein one or the other of the brake lines 154, 155 when inoperative, for example the rear brakes as shown in FIGURE 17, may be isolated to prevent loss of brake-fluid with resultant inoperativeness of the brake line operative to control the front brakes were sufficient fluid not available for that purpose.

An indicator and resetting arm 271 is fixed at one end as by pin 272 to an exteriorly projecting end portion of said shaft 259 for co-rotation, and the free end of said arm 271 defines a "pointer" registrable with indicia F–N–R impressed or otherwise applied in a curving embossment on the side of said valve body VB$^m$ in circumferentially spaced relation to the axis of said shaft 259, said indicator arm also having a circular hub merging into a radial flange 273 extending to said "pointer" to serve as a tab (finger-piece) whereby manual resetting of the valve piston VB$^m$ to its operating positions designated by the aforesaid three indicia may be effected at will wherein the aforesaid detent element 221 selectively occupies the apex 240 of the central notch 236 or releasably engages one or the other of the "shutoff" positioning notches 235, 237 as shown in FIGURE 17.

Accordingly, the aforesaid indicator arm 271 and detecting switch combine to produce my novel modified warning signal system WS$^m$, said indicator serving to visibly display the operating condition of the dual master brake cylinder DC$^m$ in relation to the two brake lines 154, 155 which influence the operational behavior of the valve piston VP$^m$, when the vehicle is standing, while the electric system visibly indicates such working condition to the driver while operating the vehicle, thus my novel warning systems serves both as an under-the-hood and a driver compartment signaling device to insure that while the vehicle is being serviced or otherwise inspected, the mechanical indicator 271 shows the operating condition of the dual brake system, and while operating the vehicle on the highway, the light bulbs show by a "red" signal to the driver such condition of the brake systems.

In the case of an inoperative brake line, for example, the line 154 serving the rear brakes, differential pressure on opposite ends of said valve piston VP$^m$ would force the latter downwardly to its lower extreme position shown in FIGURE 17 wherein the axial bore 212 is isolated from the discharge port 218 and the latter port placed in communication via said cutout 232 with the fluid return port 219 thus enabling idling fluid worked by the piston 77 during operation of the piston 78 to apply and release the front brakes, to return to the reservoir 25 via return port 219, chamber 227, cavity 226 and coaxially connected return passage 35. Similarly, should the front brake line 155 fail, the differential pressure at opposite ends of said valve piston VP$^m$ would force the latter upwardly to its extreme "shutoff" position to disconnect the discharge ports 228, 218 and connect the latter port to the return port 220, chamber 227, cavity 226 and connected passage 35 as shown.

It is important to note that when the valve piston VP$^m$ is moving within its normal fluid-balancing range "N" that the movable contact arm 266 of the warning switch is not engageable with either of the fixed contacts 257, 258 therefore the warning switch remains "open" with the light bulbs "off," but upon movement of said valve piston VP$^m$ to either of its extreme "shutoff" positions of control, the contact arm selectively engages the proper fixed contact to complete the circuit to the connected light bulb to turn it "on" and thus produce a "red" signal as a warning that the associated brake line has failed and therefore full reliance for braking safety is shifted to the operative brake line. Therefore, the aforesaid warning switch may be termed a double-throw type generally designated SS$^m$ characterized by a central "off" and two selective "on" positions to conrol selective energization of the signal lights to warn the driver when a brake line fails, said lights being supplemented by an auxiliary warning device in the way of said mechanical indicator operated by the valve piston VP$^m$ to indicate the operating status of the dual brake system even though the car is parked with the engine stopped which latter condition would negate the effectiveness of the electric system since the ignition switch MS$^m$ would be turned "off."

*The second modified warning system*

FIGURES 18 and 19 disclose a modified form of warning system generally designated WS$^n$ and wherein the energizable modified electric circuit EC$^n$ comprises the battery SB$^m$ grounded at 249, master (ignition) switch MS$^m$ operable to "on" and "off" positions and which in turn is connected at one side by lead 248 to the aforesaid battery SB$^m$, and the other side of said switch being connected by lead 247 to one side of the energizable signaling element (light bulb) 198 located in a smaller signal box 275, and the other side of said bulb being connected by the conductor 251 which leads to a terminal post 276 mounted on the closed insulative end 255 of the hollow switch box 256, said terminal post being connected to the medial portion of a bridging segment 277 which interconnects the pair of stationary switch contacts 257, 258 provided with flexible outturned free end portions in parallelly spaced horizontal relation to produce this modified signal switch generally designated SS$^n$ in which the aforesaid switch-actuating contact arm 266 is operable to selectively engage said contacts 257, 258 in the same manner as described in connection with the operation of the signal swich SS$^m$ (see FIGURE 15), said contact arm serving as a ground to complete the circuit EC$^n$ to the battery SB$^m$ upon said contact arm engaging one or the other of said contacts 257, 258 in synchronism with movement of the fluid-compensating and shutoff valve piston VP$^m$ to either of its extreme "shutoff" and/or "compensating" positions whereby said signal light is turned "on" to indicate that one or the other of the braking systems is defective without identifying which one as in the case of either the main or first modified embodiment of the present invention.

*Operational summary*

From the foregoing description considered with the drawing, it will be seen that the objects specifically enumerated above as well as others have been achieved, to produce my novel and improved dual master brake cylinder DC in simplified design, however, in the interest of further clarification a brief restatement will be given with emphasis on the interaction of the various parts and resultant novel and beneficial advantages provided.

In the relative positions of the parts shown in FIGURES 1 and 2, my novel dual master cylinder DC is in fully retracted (relaxed) disposition wherein the front and rear wheel brakes WB are released (off). The fluid in the working chambers 97, 98 is at atmospheric pressure (static) corresponding to that contained in the fluid-supply reservoir 25 in consequence of the air vent 37 in the reservoir cover and the compensating ports 32, 33 being open. Under such conditions, the line pressure to the wheel cylinders 191, 192 which actuate their respective brake assemblies is at substantially 6–8 p.s.i., in accordance with the spring setting of the residual pressure check valves RV associated with the discharge ports 23, 24, respectively. The dual fluid-displacement pistons 77, 78 are in their respective normally retracted positions in readiness for simultaneous movement under influence of pedal P operation, for example, to the dashed line position of FIGURE 1, to move the brake fluid under pressure from the working chambers 97, 98 through their associated one-way checks valves embodied in their respective residual pressure check valves RV into the discharge ports 23, 24 and separate rear and front brake lines 154, 155, respectively, to apply the corresponding service brakes of the vehicle.

Initial movement of the pistons 77, 78 as a unit from the FIGURE 1 position, first isolates the compensating ports 32, 33 from their respective working chambers 97, 98 which conditions the pistons reciprocable therein to effect pressurization of the trapped fluid and displace the same into the connected brake lines 154, 155, respectively, to actuate the vehicle brakes shown in FIGURE 1 in a well known manner. Accordingly, operation of my dual master cylinder is similar to the conventional single-piston type used on present day motor vehicles and the like without sacrificing any of the time-proven operating characteristics such as "pumping" the brakes on, or "feathering" action of the pedal for accurately controlling the effective braking force by preventing cavitation in the fluid columns or for "inching" the vehicle in close quarters as when parking.

To release the brakes, the operator merely removes foot pressure from the pedal P and in consequence of which, the brake shoe return springs and piston return springs team together to bias the pistons 77, 78 toward normally retracted position shown in FIGURES 1 and 2 wherein the forward edges of the annular lips on the piston cups 93, respectively, are disposed slightly to the right of the compensating ports 32, 33 as shown in FIGURE 2 to interconnect their respective working chambers 97, 98 with the reservoir 25.

It is thus seen that I have produced a novel and improved dual master brake cylinder which operates in similar fashion to the conventional single-piston unit, but is characterized by the special and important advantage of providing a double-safe brake system so that should one brake line fail, the other brake line is available to safely control the vehicle under the driving conditions, that is to say, that if the front brakes become inoperative the driver can still rely on the rear brakes, without loss-of-pedal from the position normally occupied substantially when both brake lines were operative.

In present-day motor vehicles equipped with the conventional single-piston master cylinder, should brake line failure occur at any point in the overall brake system, the service brakes at all four wheels would be instantly rendered ineffective, and the pedal would drop to the floorboard as evidence of this condition.

The dual pistons 77, 78 operate as a unit in a fluid-pressurizing direction of movement through the mechanical connection with the aforesaid piston-actuator PA, therefore should one of the brake lines fracture rendering the associated brake system inoperative, or loss of fluid at any point in the dual brake system, the operative cylinder moves the valve piston VP of the fluid-compensating and shutoff valve means CSV to its extreme "shutoff" position with respect to the inoperative system to prevent loss of fluid through the connected brake line without interrupting the operative cylinder to function in normal fashion to apply and release the connected wheel brakes. My novel fluid-compensating valve CSV has the additional function of effecting fluid-balance (equalized displacement) in the dual brake system in the event one system requires more fluid than the other for "solid" set up of the brakes by both pistons 77, 78. The valve piston VP is double-acting for movement to two extreme "shutoff" positions and through a fluid-compensating range of movement therebetween to effect the aforesaid fluid-balance automatically as required. The aforesaid detent mechanism DM operably related with said valve piston VP produces further beneficial results by biasing the valve piston within its fluid-balancing range N toward its central position 240 upon retracting the pedal P, and also functions to releasably stabilize the valve piston in either of its two extreme "shutoff" positions to isolate the defective brake line without interrupting the operative line to carry out braking control. Thus, the detent mechanism DM accommodates fluid-balancing movement by the valve piston VP from its central position 240 in either direction to compensate for any fluid demand differential in the two brake systems so that upon depressing the pedal P both systems will set up "solid," otherwise, the front brakes would be applied, for example, and the rear brakes unapplied and vice versa.

Accordingly, I have provided in accordance with the principles of the present invention, novel compensating valve means characterized by a single valve element (piston) for isolating an inoperative brake line, and for relative movement between said brake lines 154, 155 under influence of pressure differential therein to equalize pressure on the two separate columns of brake-fluid by said pistons 77, 78 to "solid" condition throughout both brake systems. It should be further appreciated that my double-acting compensating control valve CSV automatically compensates for an increased fluid demand by either of the systems over the other, and that minimum initial pedal movement closes the pair of compensating ports 32, 33 to render the dual cylinders operative to effect actuation of all four service brakes.

This novel and improved master brake cylinder DC features an extremely compact unit with minimal overhang with respect to the vehicle firewall or installation on a brake booster motor, and having a body of substantially the same size and shape as the single-piston master cylinder. This 2-in-1 master cylinder incorporates the aforesaid pair of parallelly disposed overlapping fluid-displacement pistons 77, 78 of substantially commercial design; utilizes a single fluid supply; a pair of compensating ports 32, 33 which communicate with said working chambers 97, 98 when their respective pistons are fully retracted to enable fluid compensation therein; mounting flange and bolt spacing similar to the conventional cylinder body above mentioned; piston cups, piston return springs, cup retainers, and residual pressure check-valve of commercil designs; and a thrust yoke operated from the pedal pushrod 84 to activate both pistons as a unit in a fluid-pressurizing direction of movement.

Further considering the operational behavior of my novel fluid-compensating and shutoff valve CSV, it is important to note that both brake lines remain open to their respective working chamber 97, 98 as long as substantially balanced pressures are effective at or above the predetermined residual pressure of approximately 8–10 p.s.i., thus enabling the brake-fluid to communicate with the separate brake lines 154, 155 to actuate the corresponding vehicle brakes. In the event that one of the brake lines ruptures or a cup fractures, a pressure differential becomes instantly effective across opposite ends of the valve piston VP to move the same to the "shutoff" position for the ruptured line to block flow of fluid therethrough, and at the same time places the associated discharge port in communication with the reservoir 25 to enable the fluid worked at substantially atmospheric pressure in the ineffective working chamber to return to the reservoir and thereby preventing loss of fluid via the ruptured line. During such shutting off operation, the operative line is maintained connected to its discharge port in order that the brakes communicating therewith may be employed to control the vehicle. In this manner, should failure occur in the rear brake line 154, for example, the valve piston VP would instantly and automatically isolate this line and return the fluid worked by its associated fluid-displacement piston back to the reservoir for recirculation through the ineffective chamber to maintain the dual brake system closed, that is to say, to prevent fluid loss through the defective line. Upon repairing the defective line or cup as the case may be, the valve piston VP would be manually reset to its normal position of control N so that both brake lines will be operative, such resetting of the valve piston being accomplished at will by a simple manual operation. Thereafter, both front and rear brake lines carry the same line pressure to apply and release the vehicle brakes.

The valve piston is preferably the "shuttle-type" under restraint of a spring-loaded detent thus requiring a substantial pressure difference on opposite ends before the valve piston VP becomes activated to one or the other of its two extreme "shutoff" positions of control according to which of the brake lines is broken, while movement of the valve piston within its intermediate range N serves to compensate for any difference in fluid demand in the two brake lines.

To avoid the hazardous possibility of driving the car with only one set of brakes operating as in the case of even driving the car at relatively slow speeds which would require minimal braking effort on the part of the driver, the afore-described warning signal system WS would indicate which of the brake lines was inoperative when the brakes are applied. If both lights, for example, show "off" the driver would know that all of the brakes were working, but should one of the lights show "red," this would indicate the defective brake line.

The invention contemplates that the stoplights could be employed in lieu of the signal lights aforesaid by connecting one of the stoplights to the switch associated with the front brake cylinder, and the other stoplight connected to the switch controlled by the rear brake cylinder. When one of the stoplights fails to turn "on," this would visibly indiacte that the associated brake line was not working properly, thus enabling the driver of a following car to bring this to the attention of the driver of the car having only one stoplight operating so that suitable servicing steps could be taken to restore both stoplights to turn "on" by repairing the defective brake line or replacing a defective light bulb as the case may be.

In using the switches SS to control the stoplights for the purpose above-described, actuation of the contacts would be reversed, that is, contact opening would be effected by the spring and contact closing by fluid pressure, and wherein the normal spring setting would be of such magnitude as to override the residual pressure establishable by said residual pressure check-valves RV upon releasing the brake-pedal P as shown in FIGURE 1, and closing actuation of the switch contacts to selectively energize said stoplights would occur upon effecting brake-applying pressure on the fluid columns in excess of said spring actuation.

In the modified forms of my invention shown in FIGURES 15 and 18, I have substituted a single-pole double-throw switch for the two conventional fluid-spring operated switches SS disclosed in the main embodiment. This double-throw switch is synchronized with the manual and automatic warning indicator and resetting mechanism wherein said switch remains "open" while the indicator is operating within the N range of fluid-compensating movement, therefore the two light bulbs in the signal panel would be "off" (see FIGURE 15); but upon the indicator moving to F or R position the corresponding brake line would be signaled as defective and therefore isolated from the dual master cylinder $DC^m$ to prevent fluid loss from such open line. At the same time, the operative master cylinder would function to control the connected brakes in usual manner thus providing brake control notwithstanding only one line of the dual brake system is operative.

Accordingly, when the indicator indexes to R position, for example, the corresponding contacts in the double-throw switch engage to complete the circuit to the corresponding light bulb in the signal panel to show "red" as a warning to the driver, and should the indicator index to F position then this would signal that the front brake line is open by turning on the corresponding light bulb to show "red" in response to closing the associated contacts to complete the circuit for the latter light bulb.

In a vehicle equipped with the modified warning system $WS^n$ (see FIGURE 18), and which includes a single signaling element (light bulb), should one of the brake lines fail, the inoperative line would not be electrically indicated but the driver would know that both braking systems were not functioning properly; but in installations which include my novel warning indicator as shown in FIGURES 15 and 18, the driver would only have to observe the position of the indicator after being warned by the "red" signal light, to ascertain which one of the brake lines had failed. Accordingly, where the single signal light is employed (see FIGURE 18), it would be advantageous from a safety standpoint for the indicator to work in conjunction therewith to avoid costly inspecting and checking to pinpoint the exact location of the defect in the inoperative brake line.

Further considering the novelty and adaptability of the novel compensating and shutoff valve means CSV, the dual functions thereof, namely: (1) compensating for any imbalance in the independent fluid columns which control the front and rear brakes, respectively, and (2) preventing loss of reservoir fluid via the inoperative brake line, may be employed jointly or separately depending on the type of reservoir associated with the dual master cylinders, that is, whether a single compartment is used or dual compartments. It is important to note, however, that the "shutoff" function of this valve means is utilized with dual master brake cylinders having a single fluid reservoir compartment which serves both cylinders as in the case of the present disclosure but such "shutoff" function may be dispensed with when said valve means are operatively related with a dual master brake cylinder having two separate fluid-supply reservoirs, one for each cylinder, thus utilizing the "fluid-compensating" function only. The invention contemplates that this valve means may be utilized for adjusting any differential in fluid demand in the two independent brake systems controlled by commercial dual master brake cylinders characterized by two separate fluid-supply reservoirs serving the two cylinders, respectively, and thereby negating a need for the aforesaid "shutoff" function.

Therefore, the present invention embodies novel valve means communicating with the two independent brake lines 154, 155, said means being adapted to effect fluid compensation in said brake lines for any fluid differential therebetween and/or isolate the fluid-supply reservoir serving an open line, and wherein a signal warning device automatically indicates to the driver which line is inoperative or that one of the lines is defective without designating which one. The warning systems WS and WS$^m$ signal which one of the brake lines is defective while the warning system WS$^n$ signals that one of the lines is defective without indicating which one. In the event that both brake lines should fail causing the overall braking system on the vehicle to be completely ineffective, no warning system could anticipate such complete failure, however, loss-of-pedal would alert the driver so that emergency braking through the parking brake and simultaneous deceleration of the engine therefore the vehicle, could enable bringing the vehicle under control even though the service brakes are lost, meaning that safe driving requires that the driver keep a safe stopping distance from the vehicle next ahead so that should loss of service braking occur, the emergency steps above-mentioned could be resorted to, and in no case, should the vehicle be started forward or in reverse without first pressing the brake pedal to determine if the service brakes are operating.

Special beneficial results in the control of a motor vehicle or the like equipped with my novel dual master brake cylinder DC are provided by having both a mechanical and an electric warning signal as shown in FIGURES 15 and 18 which may be operably related with the valve piston VP of the main embodiment or modified form thereof shown in FIGURES 15 and 18, and thereby simplifying such system by utilizing a single signal device (light bulb) as shown in FIGURE 18. The electric system serves to warn the driver when the vehicle is being operated that one of the brake lines is open, and the mechanical indicator which is operable both manually and automatically, visibly signals a brake line failure when under-the-hood servicing is being made and maintains such signal effective until manually reset while in the case of the electric signal, the driver may fail to observe the warning light while driving the vehicle and then upon stopping the car, turning "off" the ignition switch to stop the engine would negate such signal thus leaving vehicular control to a signal brake system.

Moreover, should the driver fail to observe the electric warning before stopping the engine, it is possible that the condition of the dual brake system as shown by the indicator would be noticed by the service attendant or mechanic. As above stated, the mechanical indicator remains in the position corresponding to the inoperative condition of the dual brake system whether the the engine is running or turned "off," while the electric system is effective to warn the driver provided he observes it, when the engine is running (ignition switch "on"). An important advantage which the mechanical indicator has over the electric warning device, is that the indicator not only shows which of the two brake systems is defective but additionally indicates which of the two systems is requiring more fluid than the other by observing the indicator in its fluid-balancing range of movements when the brakes are applied, that is, if the indicator indexes the N position then both brake systems are using substantially the same amount of brake-fluid, but if the indicator moves from said N position toward R position, for example, this would indicate that the fluid demand in the rear brake system is greater, and similarly, if the indicator becomes positioned toward F position, such would be indicative of the front brake system requiring more fluid than the rear system. In either case, where the indicator has moved close to either F or R position, an inspection of the system requiring the greater amount of brake-fluid should be made to ascertain if the brake lining wear is excessive thus requiring renewal or other wear points and possible leaks are such as to introduce an undesirable amount of lost-motion before the brakes set up "solid" for effective braking on all four wheels of the vehicle. Where the indicator is on or near its N position, this would be indicative that the dual brake system is functioning normally with lining wear substantially uniform on all four brake assemblies which is ideal for safety in braking control.

It should be understood that I do not wish to limit my invention to the above-described novel association of elements and details, and that the invention is intended to include such other modifications and/or substitutions readily apparent to persons skilled in the art to which the invention relates, as defined by the terms of the subjoined claims.

Having thus described my invention, I claim:

1. A fluid pressure producing actuator comprising: a chamber-defining body provided with a fluid supply reservoir; a pair of walled master cylinders adapted to receive fluid from said reservoir, said cylinders being arranged in parallelly spaced overlapping relationship with separate discharge ports therefor, respectively; separate fluid-pressure transmitting lines communicable with said discharge ports, respectively; a fluid-displacement unit reciprocably disposed in each of said cylinders and having a fully retracted position; a double-acting fluid compensating valve device operatively mounted on said cylinders and from which said fluid lines extend, respectively, said valve device having an operating range defined by two opposing extremes substantially to compensate for normal fluid displacement difference in said fluid lines; fluid communicating means between a pair of opposing portions on said valve device and said discharge ports, respectively, for controlling the aforesaid fluid compensation in response to a pressure differential effective across said opposing portions; a pair of compensating ports incorporated in said cylinder walls, respectively, and normally connecting said cylinders to said reservoir when said displacement units are fully retracted; an actuator mechanically adapted to actuate said displacement units simultaneously in a fluid-pressurizing direction; switch mechanism normally open during operation of said valve device short of said opposing extremes, and which is activatable to closed-contact condition in response to a predetermined pressure loss from one or the other of said fluid lines and thereby creating said pressure differential effective across said opposing portions on said valve device to operate the same to the corresponding extreme; an energizable electric circuit including connections to said switch mechanism and a source of electrical energy; and a signalling element in said circuit, and which is energizable in response to the aforesaid activation of said switch mechanism to closed-contact condition to indicate that one or the other of said fluid lines is losing pressure.

2. The fluid pressure actuator constructed in accordance with claim 1 in which said valve device is provided with a pair of valve lands adjacent said opposing portions, respectively, said valve lands being normally effective to maintain said fluid communicating means open during compensating range operation short of said opposing extremes, and upon operating said valve device under the aforesaid pressure differential in said fluid lines to one or the other of its opposing extremes, the corresponding valve land becomes effective to block that portion of said fluid communicating means associated with the indicated fluid line which is losing fluid and thereby isolating the latter line from its master cylinder.

3. The fluid pressure actuator constructed in accordance with claim 2 including yieldable biasing means operably related with said valve device for urging the latter intermediately of its aforesaid operating range and thereby maintaining said fluid communicating means open to enable both fluid lines to transmit fluid under pressure from their respective master cylinders.

4. The fluid pressure actuator constructed in accordance with claim 3 including an element operably related with said valve device for releasably stabilizing the latter in one or the other of its opposing extremes corresponding to the indicated fluid line which is losing fluid.

5. A dual master cylinder for controlling separate hydraulic brake systems, respectively, comprising: a chamber-defining body having a single-compartment fluid supply reservoir and a pair of cylindrical master cylinder bores arranged in parallelly spaced overlapping relationship, each of said cylinder bores being closed at one end and open at the other and having a pressure outlet port of reduced diameter through the closed end defining an annular shoulder encircling said outlet port, a resilient valve washer seated against said annular shoulder, a residual pressure check valve engaging said valve washer and engaged on its opposite side by a normally compressed spring for establishing a minimal pressure in the associated fluid line, a one-way pressure outlet valve embodied in said check valve, a piston in each cylinder reciprocable from a normally retracted position, and having a head land connected by an elongated reduced body to a guide land, an annular static fluid chamber between said lands, a resilient piston cup biased by said spring against said head land, a plurality of fluid passages in said head land controllable by said piston cup and through which fluid flows from said static fluid chamber into the corresponding cylinder bore ahead of said piston cup to prevent cavitation during retraction of the associated piston, a thrust rod socket axially formed in said piston and terminating in a blind end, and a thrust rod in each piston socket for engaging said blind end; a smaller diameter bore open at one end and closed at the other in said chamber-defining body, and which is parallelly disposed between said cylinder bores and intersects the rear open end portions of the latter; a closure plate for the open ends of the three aforesaid bores and having a central axially bored cylindrical extension coaxial with said smaller bore; a counterbore defining the inner end of said axial bore for reception of an annular pliant seal; an elongated cylindrical actuator member passing through said annular seal and slidably supported in said axial and smaller bores, and having a pair of diametrically opposed outstanding thrust projections with their outer ends fixed to the outer ends of said thrust rods, respectively, to move as a unit; a pushrod interconnecting the central portion of said actuator member with an actuatable member for actuation thereby; a fluid return passage coaxially communicating with said smaller bore; a pair of compensating ports intersecting said return passage and communicating with their respective cylinder bores ahead of said piston cups when said pistons are fully retracted; and a pair of fluid intake ports between said reservoir compartment and said static fluid chamber on said pistons, respectively.

6. A dual master cylinder for controlling separate hydraulic brake systems, respectively, comprising: a chamber-defining body provided with a fluid supply reservoir; a pair of cylindrically walled bores in said body arranged in parallelly spaced overlapping relationship with one end open and the other end closed; an intake port interconnecting the said bores with said reservoir; a smaller bore having an open end opposite a closed end, and parallelly disposed between said walled bores and intersects the open end portions of the latter; a fluid supply passage coaxially communicating with said smaller bore; a pair of compensating ports spaced from said intake port for interconnecting said walled bores with said supply passage; a pair of fluid-displacement units reciprocably disposed in said walled bores, respectively, for movement from a normally retracted position wherein said compensating ports are open; a pair of variable pressure working chambers in said walled bores between the closed ends thereof and the displacement units reciprocable therein; a pressure outlet port through each of said closed ends of said walled bores; a closure member for the open ends of the aforesaid three bores, and having a central outwardly extending cylindrical portion provided with an axial bore; an actuator mechanism slidably supported in said smaller and axial bores and which is mechanically adapted to actuate said fluid-displacement units simultaneously to pressurize the fluid in said working chambers and displace the same through their respective outlet ports upon initial actuation closing said compensating ports; and actuating means for said actuator mechanism.

7. In combination with a dual master brake cylinder for actuating vehicular front and rear wheel brake cylinders via separate fluid-transmitting lines, respectively, normally under a predetermined residual pressure: a fluid-compensating valve device operatively communicating with said fluid lines, said valve device having a valve element movable under a pressure differential created by loss of fluid from one or the other of said fluid lines, within a fluid compensating range defined substantially by two opposing extremes; switch mechanism having interposition with respect to an energizable electric circuit and provided with an element normally disposed in open-contact condition when said valve element is movably positioned within its compensating range short of said extremes, and actuatable to closed-contact condition; an energizable signaling element in said circuit and controllable by said switch element; and a pair of spaced control portions on said valve element selectively engageable with said switch element to effect actuation thereof to closed-contact condition to energize said signaling element upon said valve element moving to one or the other of its extremes as a function of said pressure differential existing in said fluid lines, and thereby indicating that one or the other of said fluid lines is losing fluid.

8. In combination with a dual master brake cylinder for actuating vehicular front and rear wheel brake cylinders via separate fluid-transmitting lines, respectively, normally under a predetermined residual pressure: a fluid-compensating valve device operatively communicating with said fluid lines, said valve device having a valve element movable under a pressure differential created by an unbalanced fluid displacement in, or a fluid loss from one or the other of said fluid lines, within a fluid-compensating range defined substantially by two opposing extremes and an intermediate normal position therebetween wherein fluid displacement in said fluid lines is substantially balanced; three spaced control portions on said valve element corresponding to the aforesaid three operating conditions of the latter; a spring-biased detent element cooperable with said control portions to releasably stabilize said valve element in the aforesaid three operating conditions; switch mechanism having interposition with respect to an energizable electric circuit and provided with an element normally disposed in open-contact condition when said valve element is moving within said fluid-compensating range, and a pair of closed-contact conditions corresponding to said extremes, respectively; a pair of energizable signaling elements in said circuit, and which are connected to their respective closed-contact conditions of said switch element, movement of said valve element within its fluid-compensating range under a pressure differential created by said unbalanced fluid displacement is effective to maintain said switch element in open-contact condition, and movement of said valve element to one or the other of its extremes under a pressure differential created by loss of fluid from one or the other of said fluid lines is effective to selectively actuate said switch element to said closed-contact conditions to selectively energize said signaling elements, and thereby indicating which one of said fluid lines is losing fluid.

9. In combination with a dual master brake cylinder for actuating vehicular front and rear wheel brake cylinders via separate fluid-transmitting lines, respectively, normally under a predetermined residual pressure: a fluid-compensating valve device operatively communicating with said fluid lines, said valve device having a valve element movable within a fluid-compensating range terminating substantially at two opposing extremes; switch mechanism having interposition with respect to an energizable electric circuit and provided with an element movable in response to a pressure drop in one or the other of said ffuid lines below said residual pressure, from a normal open-contact condition to a pair of selective closed-contact conditions; a pair of energizable signaling elements in said circuit and connected to said switch element to selectively energize said signaling elements upon movement of the former to one or the other of said closed-contact conditions as a function of said pressure drop in one or the other of said fluid lines to accommodate movement of said valve element to a corresponding extreme, and thereby indicating which one of said fluid lines is losing fluid.

10. In combination with a dual master brake cylinder for actuating vehicular front and rear wheel brake cylinders via separate fluid-transmitting lines, respectively, normally under a predetermined residual pressure: a fluid-compensating valve device having a valve element movable within a fluid-compensating range defined substantially by two opposing extremes; an indicator arm movable in synchronism with movements of said valve element within said fluid-compensating range to visibly indicate the fluid demand differential and to said extremes to indicate a pressure differential in said fluid lines; and a mechanical connection between said valve element and said indicator arm enabling unitary movement thereof, said pressure differential in said fluid lines reacting on opposing portions of said valve element to move the latter to a corresponding extreme, and thereby moving said indicator arm accordingly to indicate which one of said fluid lines is losing fluid.

11. In combination with a dual master brake cylinder for actuating vehicular front and rear wheel brake cylinders via separate fluid-transmitting lines, respectively, normally under a predetermined residual pressure: a fluid-compensating valve device having a valve element movable within a fluid-compensating range defined by two opposing extremes; resilient means operatively effective on said valve element for releasably stabilizing the latter in either of its extremes; an indicator arm movable in synchronism with movements of said valve element between said extremes to indicate a pressure differential created by loss of fluid from one or the other of said fluid lines; and a mechanical connection between said valve element and said indicator arm enabling synchronous movements thereof whereby said pressure differential reacting on two opposing portions of said valve element is effective to move the latter to a corresponding extreme, and thereby moving said indicator arm accordingly to indicate which one of said fluid lines is losing fluid.

12. In combination with a dual master brake cylinder for actuating vehicular front and rear wheel brake cylinders via separate fluid-transmitting lines, respectively, normally under a predetermined residual pressure: a fluid-compensating valve device having a valve element movable under a pressure differential in said fluid lines within a fluid-compensating range defined substantially by two opposing extremes; resiliant means operatively effective on said valve element for releasably stabilizing the latter in either of its extremes, and for biasing the latter intermediately of said extremes in opposition to fluid-compensating movements of said valve element wherein fluid displacement in said fluid lines is substantially balanced; an indicator arm movable in synchronism with movements of said valve element between said extremes to indicate a pressure differential in said fluid lines created by loss of fluid from one or the other of said fluid lines, and to indicate a fluid displacement differential in said fluid lines in accordance with valve movements within said fluid-compensating range short of said extremes; and a mechanical connection between said valve element and said indicator arm enabling synchronous movements thereof whereby said pressure differential in said fluid lines reacting on two opposing portions on said valve element, is effective to move the latter to a corresponding extreme, and thereby moving said indicator arm accordingly to indicate which one of said fluid lines is losing fluid.

13. A dual master cylinder for hydraulic brake systems characterized by separate fluid-transmitting lines, comprising: a chamber-defining body having a single-compartment fluid supply reservoir and a pair of cylindrical master cylinder bores arranged in parallelly spaced overlapping relationship, each of said cylinder bores having an open end and a closed end; a pressure outlet port of reduced diameter through the closed end; an annular shoulder encircling said outlet port; a resilient washer seated against said annular shoulder; a residual pressure check valve engaging said resilient washer and engaged on its opposite side by a normally compressed spring; a one-way pressure outlet valve embodied in said check valve; a piston reciprocably disposed in said cylinder bore and having a head land; a resilient piston cup biased by said spring against said head land; an elongated reduced central body; a guide land defining the piston end opposite said head land; an annular static fluid chamber between said lands; a plurality of fluid passages in said head land controllable by said piston cup and through which fluid flows from said fluid chamber into the corresponding cylinder bore to prevent cavitation therein ahead of said piston cup during retractile movement of the associated piston; a thrust rod socket extending from said guide and into said reduced body and terminating therein in a blind end; and a thrust rod projecting into said piston socket in engagement with its blind end; a blind bore of smaller diameter parallelly disposed between said cylinder bores and which intersects the rear open end portion of the latter; a closure plate for the open ends of the three aforesaid bores and having a central axially bored extension coaxial with said smaller bore; a counterbore defining the inner end of said axial bore for reception of an annular pliant seal; an elongated actuator member slidably passing through said annular seal and supported in said axial bore and smaller bore and having a pair of diametrically opposed outstanding thrust elements with their outer ends fixed to the outer ends of said thrust rods, respectively, to move as a unit; a pushrod interconnecting the central portion of said actuator member with an actuatable mechanism for actuation thereby; a fluid return passage coaxially communicating with said smaller bore; a pair of compensating ports intersecting said return passage and communicating with their respective cylinder bores when said pistons are fully retracted; a fluid intake port for maintaining said reservoir compartment in communication with said annular static fluid chambers on said pistons, respectively; a fluid-compensating and shutoff valve device having a double-acting valve piston with its opposite ends normally communicating with said outlet ports, respectively; separate fluid-transmitting lines extending from said valve device, the latter being adapted to equalize displacement in said fluid lines and to isolate a defective line in response to a pressure differential effective on the opposite ends of said valve piston; yieldable biasing means operably related with said valve piston in opposition to and in cooperation with said pressure differential for urging said valve piston toward a central normal position with respect to the two extremes defining a range of movement in which said fluid equalization is effected in said fluid lines, and for releasably stabilizing said valve piston in a different pair of extremes outside said first-defined extremes, respectively, to isolate the corresponding defective line; a pair of switches spring-actuatable to close-contact positions, respectively, in response to pressure loss below a predetermined minimal residual pressure in said fluid lines; an energizable electrical circuit including electrical connections with said closed-contact positions and a source of electrical energy; and a pair of signaling elements in said circuit selectively energizable in response to actuation of said switches, respectively, to closed-contact position in accordance with the inoperative condition of said fluid lines.

14. A dual master cylinder for hydraulic brake systems characterized by separate fluid-transmitting lines, comprising: a chamber-defining body having a single-compartment fluid supply reservoir and a pair of cylindrical master cylinder bores arranged in parallelly spaced overlapping relationship, each of said cylindar bores having an open end and a closed end; a pressure outlet port of reduced diameter through the closed end; an annular shoulder encircling said outlet port; a resilient washer seated against said annular shoulder; a residual prassure check valve engaging said resilient washer and engaged on its opposite side by a normally compressed spring; a one-way pressure outlet valve embodied in said check valve; a piston reciprocably disposed in said cylinder bore and having a head land; a resilient piston cup biased by said spring against said head land; an elongated reduced central body; a guide land defining the piston end opposite said head land; an annular static fluid chamber between said lands; a plurality of fluid passages in said head land controllable by said piston cup and through which fluid flows from said fluid chamber into the corresponding cylinder bore ahead of said piston cup to prevent cavitation therein during retractile movement of the associated piston; a thrust rod socket extending from said guide land into said reduced body to a predetermined blind end; a thrust rod projecting into said piston socket in engagement with its blind end; a blind bore of smaller diameter parallelly disposed between said cylinder bores and which intersects the rear open end portions of the latter; a closure plate for the open ends of the three aforesaid bores and having a central axially bored cylindrical extension coaxial with said smaller bore; a counterbore defining the inner end of said axial bore for reception of an annular pliant seal; an elongated cylindrical actuator member slidably passing through said annular seal and supported in said axial and smaller bores and having a pair of diametrically opposed outstanding thrust elements with their outer ends fixed to the outer ends of said pair of thrust rods, respectively, to move as a unit; a pushrod interconnecting the central portion of said actuator member with an actuatable mechanism for actuation thereby; a fluid return passage coaxially communicating with said smaller bore; a pair of compensating ports interconnecting said return passage with their respective cylinder bores ahead of said piston cups when fully retracted; a fluid intake port for maintaining said reservoir compartment in communication with said pair of annular chambers on said pistons, respectively; a fluid-compensating and shut-off valve device having a double acting valve piston movably mounted in a bore formed coextensively in a valve body on said chamber defining body; another pair of outlet ports formed in said valve body and adapted to connect said valve bore with said separate fluid lines, respectively, the opposite ends of said valve piston being normally in communication with said first and second defined outlet ports, respectively, said valve device being adapted to equalize displacement in said fluid lines and to isolate a defective line in response to a pressure differential effective on the opposite ends of said valve piston to move the same; yieldable biasing means operably related with said valve piston in opposition to and in cooperation with said pressure differential for urging said valve piston toward a central normal position with respect to two extremes defining a range of valve piston movement in which such fluid equalization is effected in said fluid lines, and for releasably stabilizing said valve piston in a different pair of extremes outside said first-defined extremes, respectively, to isolate the corresponding defective line; a switch device having a hollow open-sided box mounted on said valve body with the open side communicating with said valve piston through an opening provided in said valve body; an oscillatable grounded contact arm fast at one end on a switch-actuating shaft rotatably mounted on said box transversely of said open side; a pair of flexible elongated contacts mounted at one end on said box and insulated therefrom, said contacts being arranged on opposite sides, respectively, of said contact arm for selective engagement therewith; a pair of terminals connected to said flexible contacts, respectively; separate conductors connected to said terminals and to one side of a pair of signaling elements, respectively, the other side of the latter being connected by a conductor having a common connection to one side of a manual switch operable to "off" and "on" positions, the other side of the latter being connected by a conductor to one terminal of a storage battery with its other terminal serving as a ground whereby an electrical detecting system is produced; a mechanical connection between said contact arm and said valve piston to produce unitary movement thereof; an indicating arm mounted on said actuating shaft exteriorly of said switch box to register with three indicia; namely, N denoting the range of fluid demand compensation by said valve piston, and F and R denoting the front and rear brake systems, respectively, whereby movement of the valve piston within said compensating range N and to its two extreme shutoff positions F and R, is effective to move said indicating arm correspondingly to indicate the operating status of said dual brake system as a function of the operativeness of the aforesaid separate fluid lines, respectively, when the indicator arm is within the N range of movement thus indicating the brake system requiring more fluid than the other according to which side of the N indicium the indicator arm is positioned, and when the indicator arm is opposite F or R, the connected fluid line is ineffective to transmit actuating fluid to the corresponding brake system; and a finger-piece associated with said indicator arm enabling manual resetting of said valve piston at will to N range position, or to either shutoff position F or R.

15. A dual master cylinder for hydroulic brake systems characterized by separate fluid lines to the front and rear wheel cylinders, respectively, comprising: a chamber-defining body having a single-compartment fluid supply reservoir and a pair of cylindrical master cylinder bores arranged in parallelly spaced overlapping relationship, each of said cylinder bores having an open end and a closed end; a pressure outlet port of reduced diameter through the closed end thereof; an annular shoulder encircling said outlet port; a resilient washer in each cylinder bore seated against said annular shoulder; a residual pressure check-valve engaging said resilient washer and engaged on its opposite side by a normally compressed spring; a one-way pressure outlet valve embodied in said check valve; a piston reciprocably disposed in said cylinder bore and having a head land; a resilient piston cup biased by said spring against said head land; and elongated reduced central body; a guide land defining the opposite end of said piston body; an annular static fluid chamber between said lands; a plurality of fluid passages in said head land controllable by said piston cup and through which fluid flows from said fluid chamber into the corresponding cylinder bore ahead of said piston cup to prevent cavitation therein during retractile movement of the associated piston; a thrust rod socket formed in said piston body and extending from said guide land to a predetermined blind end in said piston body; a thrust rod projecting into said piston socket in engagement with the blind end thereof; a blind bore of smaller diameter parallelly disposed between said cylinder bores and which intersects the rear open end portions of the latter; a closure plate for the open ends of the three aforesaid bores and having a central axially bored cylindrical extension coaxial with said smaller bore; a counterbore defining the inner end of said axial bore for reception of an annular pliant seal; an elongated cylindrical actuator member slidably passing through said anular seal and supported in said axial and smaller bores and having a pair of diametrically opposed outstanding thrust elements with their outer ends fixed to the outer end of said thrust rods, respectively, to move as a unit; a pushrod interconnecting the central portion of said actuator member with an actuatable mechanism for actuation thereby; a fluid return passage coaxially communicating with said smaller bore; a pair of compensating ports intersecting said return passage and communicating with their respective cylinder bores ahead of said piston cups when fully retracted; a fluid intake port for maintaining said reservoir compartment in communication with said pair of annular fluid chambers on said pistons, respectively; a fluid-compensating and shutoff valve device operatively incorporated in said chamber-defining body; a valve bore in said body open at opposite ends and having terminal threaded portions; a liner pressfitting said valve bore between said terminal threaded portions; a pair of closure caps threadingly engaging said terminal threaded portions to close the open ends, respectively, of said valve bore; a pair of ports in said valve liner communicating with the aforesaid pair of outlet ports for said cylinder bores, respectively; another pair of outlet ports in said body opposite the first-defined outlet ports, and from which said separate fluid lines communicate with said front and rear wheel cylinders, respectively; another pair of ports in said valve liner opposite the first-defined pair of ports therein, and which communicate with the other pair of outlet ports, respectively; a fluid return port in said valve liner intermediate said other pair of ports therein, and communicating with said fluid return passage; a shiftable valve element in said valve liner and having a normal central position maintained by equivalent fluid demand in both brake systems, and two shutoff extreme positions establishable by a pressure differential effective on opposite ends of said valve element; a pair of opposing terminal valve lands and an intermediate land formed on said valve element and defining with a pair of reduced interconnecting body portions, a pair of annular fluid valve chambers; fluid passage means in said valve element interconnecting said valve chambers; a pair of variable pressure valve chambers between said terminal lands and said pair of closure caps, respectively, said latter chambers normally interconnecting corresponding pairs of said ports in said valve liner; a central apex groove indented in the central portion of said valve liner and from which a pair of tapering camming surfaces radiate in opposite directions; a pair of longitudinally spaced annular detent grooves at the terminal portions of said camming surfaces opposite their common apex groove; an annular groove medially formed in said intermediate valve land; and an expansible and contractible split detent ring mounted in said last-defined annular groove, said detent ring being adapted to cooperate with said camming surfaces to urge the valve element toward its central position defined by said apex groove wherein the fluid demand of said separate fluid lines is equalized, movement of said valve element from its apex groove position is effective to compensate for any fluid demand differential in said separate fluid lines during activation of said brake system, and movement of said valve element to either of its extreme shutoff positions is effective to isolate the corresponding port in said valve liner communicating with its associated first-defined outlet port from its connected fluid line, and connecting said first-defined port with the fluid return port aforesaid in said valve liner to prevent fluid loss from the corresponding cylinder bore, said detent ring being effective to releasably engage the corresponding detent groove in said valve liner and thereby establishing the corresponding extreme shutoff position, and when said detent ring is movably engaging said camming surfaces the valve element is being biased toward its central normal position wherein said detent ring is engaging said apex groove in opposition to pressure differential effective on opposite ends of said valve element to compensate for fluid demand differential in said separate fluid lines whereby upon actuating said valve element said actuatable mechanism remains in its central normal position such being indicative that the fluid demand in said separate fluid lines is equalized.

16. The combination of a dual master brake cylinder for actuating vehicular front and rear wheel brake cylinders having connected separate fluid-transmitting lines, respectively, normally under a predetermined minimal residual pressure: with a warning signal device having a pair of energizable signaling elements, one for each fluid line; a pair of switches, each having a pair of fixed contacts engageable by a movable contact member; a pressure-responsive wall for operatively disengaging said contact member from said pair of fixed contacts with respect to each switch to establish open-condition thereof; a fluid pressure connection between said wall and the associated fluid line; a normally compressed spring for engaging said contact member with said pair of fixed contacts with respect to each switch to establish closed-condition thereof upon the pressure loss in the associated fluid line dropping to a value less than said residual pressure; an electrical circuit including said signaling elements with connections from one side thereof to one of the fixed contacts, respectively, of each switch, the other of the fixed contacts of each switch having connections, respectively, to one side of a manual switch operable to "off" and "on" positions, the other side of the latter having a connection to a source of electrical energy provided with a ground connection, and the other side of said signaling elements having a ground connection enabling completion of said circuit to each signaling element to energize the same upon operating said manual switch to "on" position and spring-actuation of said contact member into engagement with the corresponding pair of fixed contacts relating to the associated fluid line in response to the aforesaid pressure loss from the latter.

17. The combination of a dual master brake cylinder for actuating vehicular front and rear wheel brake cylinders via separate fluid-transmitting lines, respectively, normally under a predetermined minimal residual pressure: with a warning signal device having a pair of energizable signaling elements, one for each fluid line; a pair of switches, each having a pair of fixed contacts engageable by a movable contact member; a pressure-responsive wall for operatively disengaging said contact member from said pair of fixed contacts with respect to each switch to establish open-condition thereof; a fluid pressure connection between said wall and the associated fluid line; a normally compressed spring for engaging said contact member with said pair of fixed contacts with respect to each switch to establish closed-condition thereof upon the pressure loss in the associated fluid line dropping to a valve less than said residual pressure; an electrical circuit including said signaling elements with connections from one side thereof to one of the fixed contacts, respectively, of each switch, the other of the fixed contacts of each switch having connections, respectively, to one side of a manual switch operable to "off" and "on" positions, the other side of the latter having a connection to a source or electrical energy provided with a ground connection, and the other side of said signaling elements having a ground connection enabling completion of said circuit to each signaling element to energize the same upon operating said manual switch to "on" position and spring-actuation of said contact member into engagement with the corresponding pair of fixed contacts relating to the associated fluid line in response to the aforesaid pressure loss from the latter; a combined fluid-compensating and shutoff valve device having a hollow body operatively incorporated between said fluid lines and including a movable valve element in the hollow of said body normally occupying a central position with respect to a pair of extreme shutoff positions for said fluid lines, respectively; and a yieldable detent mechanism carried by said valve element for releasably cooperating with three spaced indentations in the hollow of said valve body defining said central and shutoff positions, respectively with the intermediate indentation having diverging camming surfaces extending from a central apex to said shutoff indentations substantially, said camming surfaces defining a fluid-compensating range of movement of said valve element, said latter element being operable under a pressure differential in said fluid lines created by a fluid demand differential in said fluid lines, to move within its compensating range to effect equalization of such fluid demand in said fluid lines and wherein said detent mechanism cooperates with said camming surfaces to urge said valve element toward its central apex position of its compensating range of movement, and also being operable to shutoff position by the pressure effective in an operative fluid line to isolate the other inoperative fluid line and thereby preventing fluid loss from the related master cylinder.

18. The combination of a dual master brake cylinder for actuating vehicular front and rear whel brake cylinders connected to separate fluid-transmitting lines, respectively, normally under a predetermined minimal residual pressure: with a warning signal device having a pair of energizable signaling elements, one for each fluid line; a single-pole double-throw switch device provided with an open sided box in which a movable grounded contact arm is positioned between a pair of spaced fixed contacts mounted on the interior of said switch box and insulated therefrom for selective engagement by said contact arm; an electrical circuit including said signaling elements with connections from one side thereof to one side of a manual switch operable to "off" and "on" positions, the other side of the latter having a connection to a source of electrical energy provided with a ground, the other sides of said signaling elements being connected to said pair of fixed contacts, respectively, whereby movement of said contact arm to selectively engage said pair of fixed contacts is effective to complete said circuit to the corresponding signaling element to energize the same; a combined fluid-compensating and shutoff valve device operatively incorporated between said fluid lines, said valve device having a valve element movable within a fluid-compensating range and to two extreme shutoff positions for said fluid lines, respectively; three spaced indentations on said valve element corresponding to said compensating range and extreme shutoff positions; spring-biased detent mechanism cooperable with said indentations to releasably stabilize said valve element in its aforesaid operating positions; a mechanical connection between said contact arm and said valve element whereby movement of the latter under a pressure differential in said fluid lines, is effective to move said valve element and said contact arm as a unit to establish the latter in its central "off" position, and in its two selective "on" positions to complete said circuit to the signaling element corresponding to the defective fluid line, said pressure differential acting on opposite ends of said valve element to influence movement thereof within its fluid-compensating range to equalize displacement in said fluid lines, and to correspondingly move said contact arm through its "off" range of movement only in accordance with the fluid demand requirement to equalize said displacement in said fluid lines, loss of pressure from one of the fluid lines being effective to cause a pressure drop below the aforesaid residual pressure with resultant movement of the valve element to the extreme shutoff position corresponding to the inoperative fluid line thus isolating the latter without interrupting the operativeness of the other fluid line.

19. The combination according to claim 18 including a switch-actuating shaft mounted on said switch box and to which one end of said contact arm is fixed and one end of said shaft projects to the exterior of said switch body; a signal arm co-rotatably mounted on said projecting shaft end; three indicia: F–N–R, respectively, displayed on the exterior of said valve device and with which said signal arm is selectively registrable to indicate the operating condition of the two fluid lines in synchronism with energization of the aforesaid pair of signaling elements; and a finger-piece on said signal arm enabling manual resetting of said valve element at will to the three aforesaid operating conditions.

20. The combination according to claim 19 in which said indicia: F–N–R designate "front brakes," "fluid-compensating range," and "rear brakes," respectively.

21. The combination according to claim 20 in which said circuit includes only one of said pair of signaling elements which is energizable upon completion of said circuit in response to closing of said switch device in synchronism with selective movements of said valve element to said extreme shutoff positions, respectively, according to loss of pressure from one or the other of said fluid lines without indicating which fluid line is inoperative.

References Cited

UNITED STATES PATENTS

| | | | |
|---|---|---|---|
| 2,046,316 | 7/1936 | Bentz | 60—54.5 XR |
| 2,353,304 | 7/1944 | Green | 60—54.6 |
| 2,879,791 | 3/1959 | Hollomann | 60—54.5 XR |
| 2,965,730 | 12/1960 | Regoli et al. | 60—54.5 XR |
| 3,228,194 | 1/1966 | Blair | 60—54.5 |
| 3,358,446 | 12/1967 | Wortz | 60—54.5 |

MARTIN P. SCHWADRON, *Primary Examiner.*

R. R. BUNEVICH, *Assistant Examiner.*

U.S. Cl. X.R.

188—152; 303—84